United States Patent [19]
Ohashi

[11] Patent Number: 5,398,135
[45] Date of Patent: Mar. 14, 1995

[54] ZOOM LENS

[75] Inventor: Kazuyasu Ohashi, Funabashi, Japan

[73] Assignee: Ricoh Company, Ltd., Tokyo, Japan

[21] Appl. No.: 28,702

[22] Filed: Mar. 4, 1993

[30] Foreign Application Priority Data

| Mar. 10, 1992 | [JP] | Japan | 4-051741 |
| Jul. 23, 1992 | [JP] | Japan | 4-196884 |
| Sep. 21, 1992 | [JP] | Japan | 4-251605 |

[51] Int. Cl.$^6$ .................................... G02B 15/14
[52] U.S. Cl. ............................ 359/692; 359/683; 359/684; 359/685; 359/713
[58] Field of Search ............ 359/692, 684, 683, 685, 359/713, 691, 682

[56] References Cited

U.S. PATENT DOCUMENTS

| 4,838,669 | 6/1989 | Ogata et al. | 359/692 |
| 4,906,077 | 3/1990 | Ito | 359/692 |
| 5,109,299 | 4/1992 | Kato | 359/692 |
| 5,243,466 | 7/1993 | Lee | 359/692 |

FOREIGN PATENT DOCUMENTS 250118 2/1990 Japan.

*Primary Examiner*—Eugene R. LaRoche
*Assistant Examiner*—Huan Hoang
*Attorney, Agent, or Firm*—Oblon, Spivak, McClelland, Maier & Neustadt

[57] ABSTRACT

A zoom lens is constructed by two lens groups in which a first lens group having a positive focal length is arranged on an object side and a second lens group having a negative focal length is arranged on an image side. A zooming operation is performed by changing a distance between the first and second lens groups. The first lens group has first to fourth lenses sequentially arranged from the object side toward the image side. The first lens is constructed by a positive meniscus lens having a convex face directed onto the object side. The second lens is constructed by a biconcave lens. The third lens is constructed by a positive lens. The fourth lens is constructed by a biconvex lens. The second lens group has fifth to seventh lenses sequentially arranged from the object side toward the image side. The fifth lens is constructed by a positive meniscus lens having a convex face directed onto the image side. The sixth lens is constructed by a negative meniscus lens having a convex face directed onto the image side. The seventh lens is constructed by a negative meniscus lens having a convex face directed onto the image side.

22 Claims, 30 Drawing Sheets

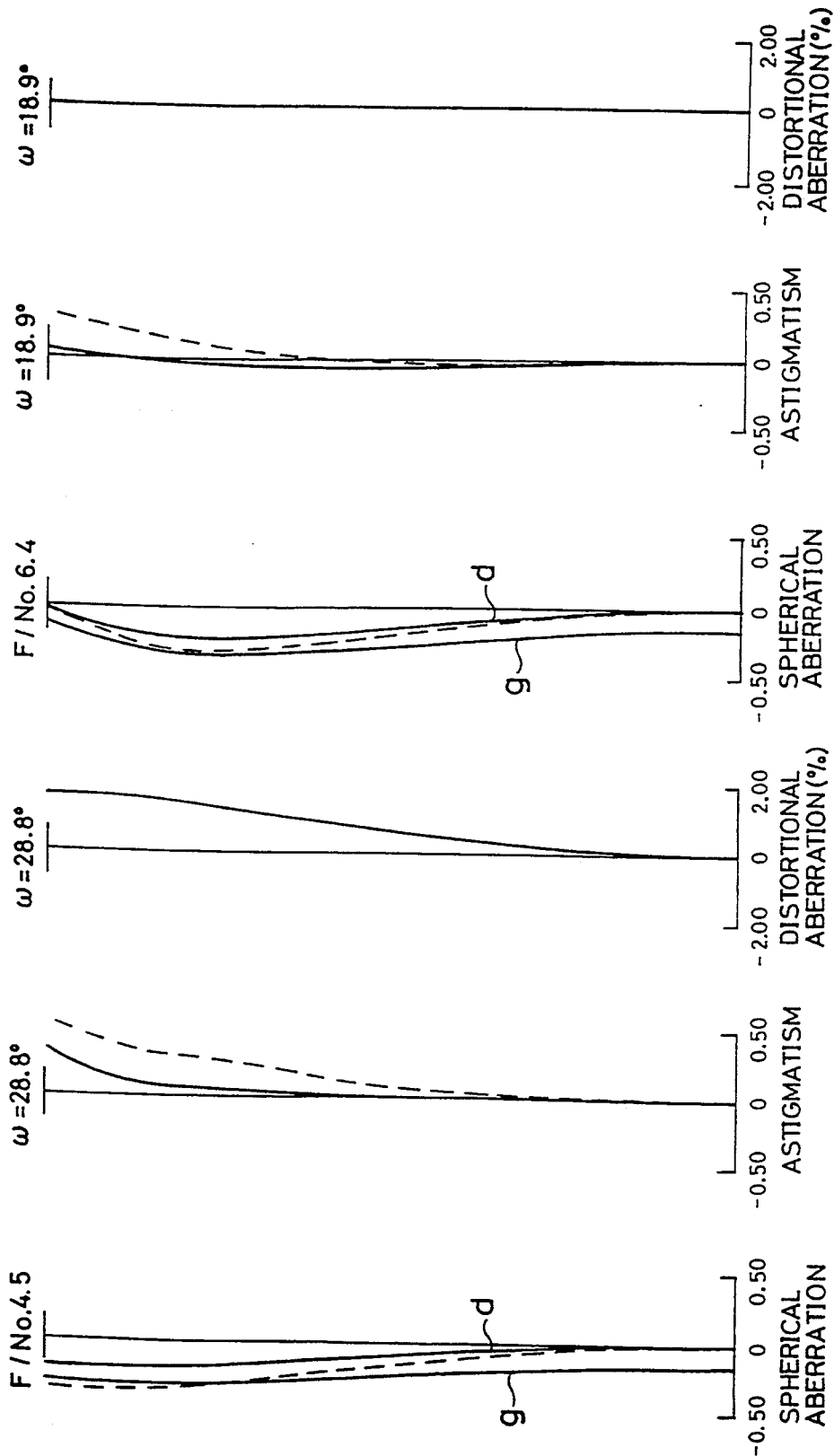

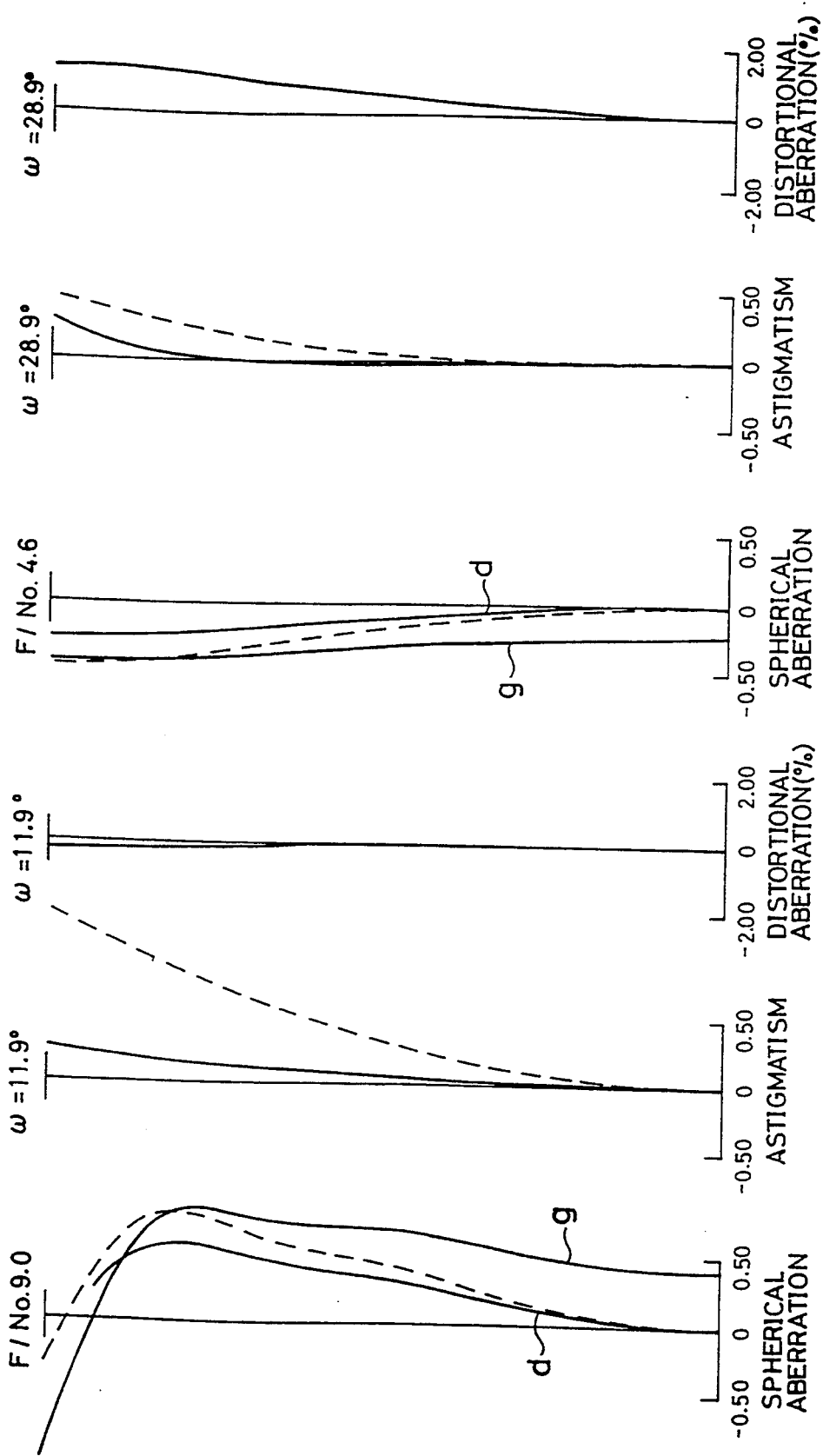

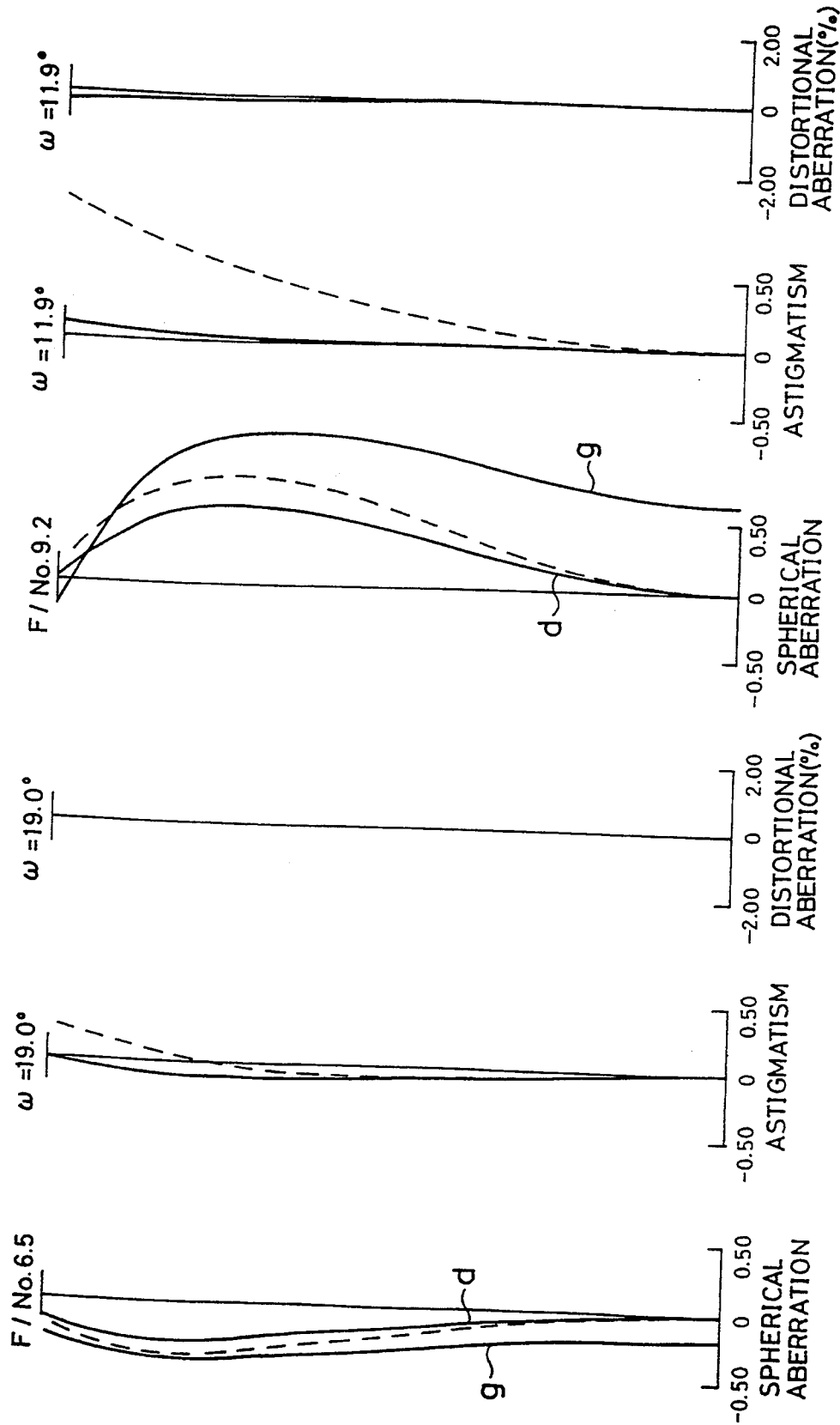

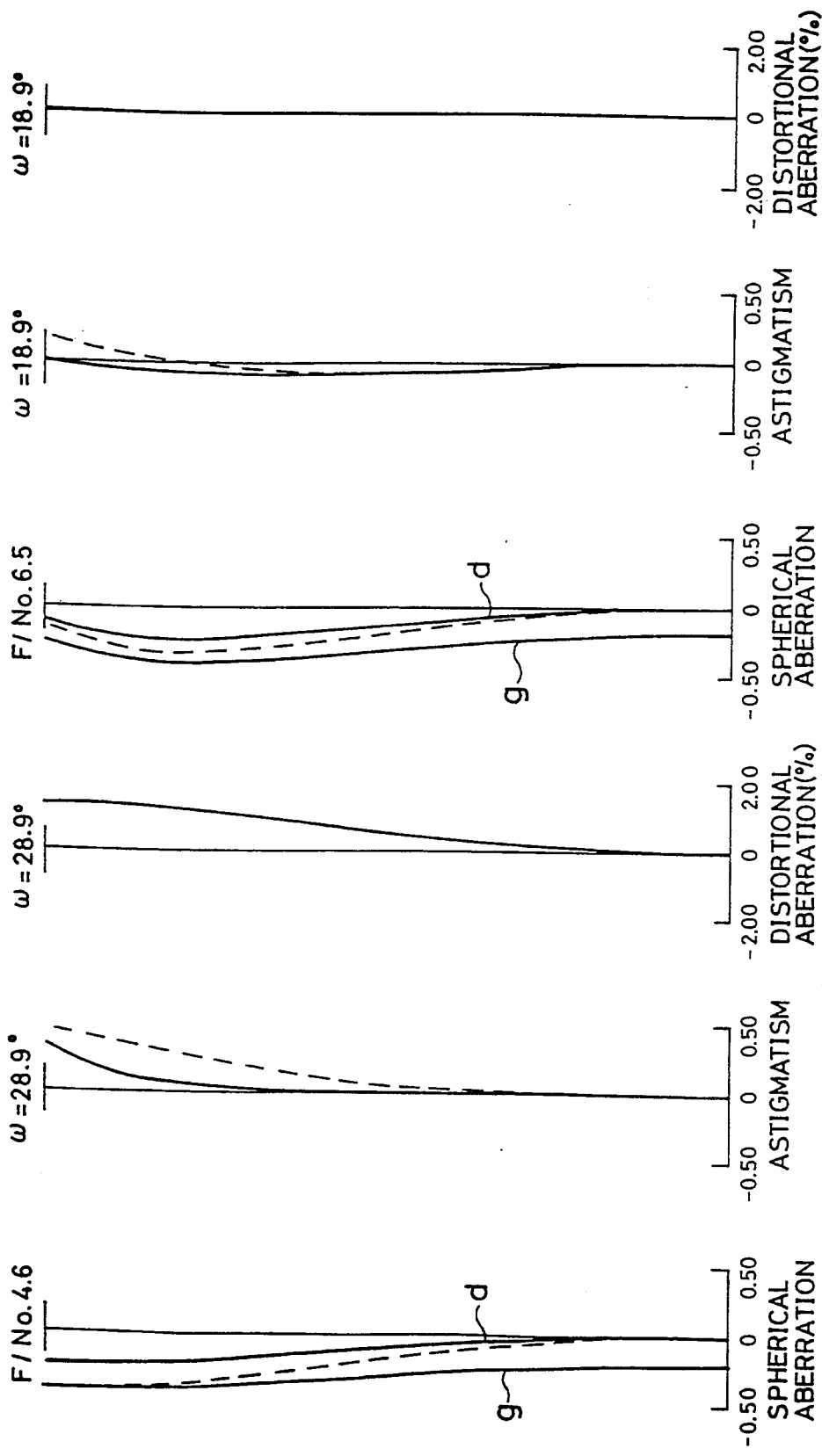

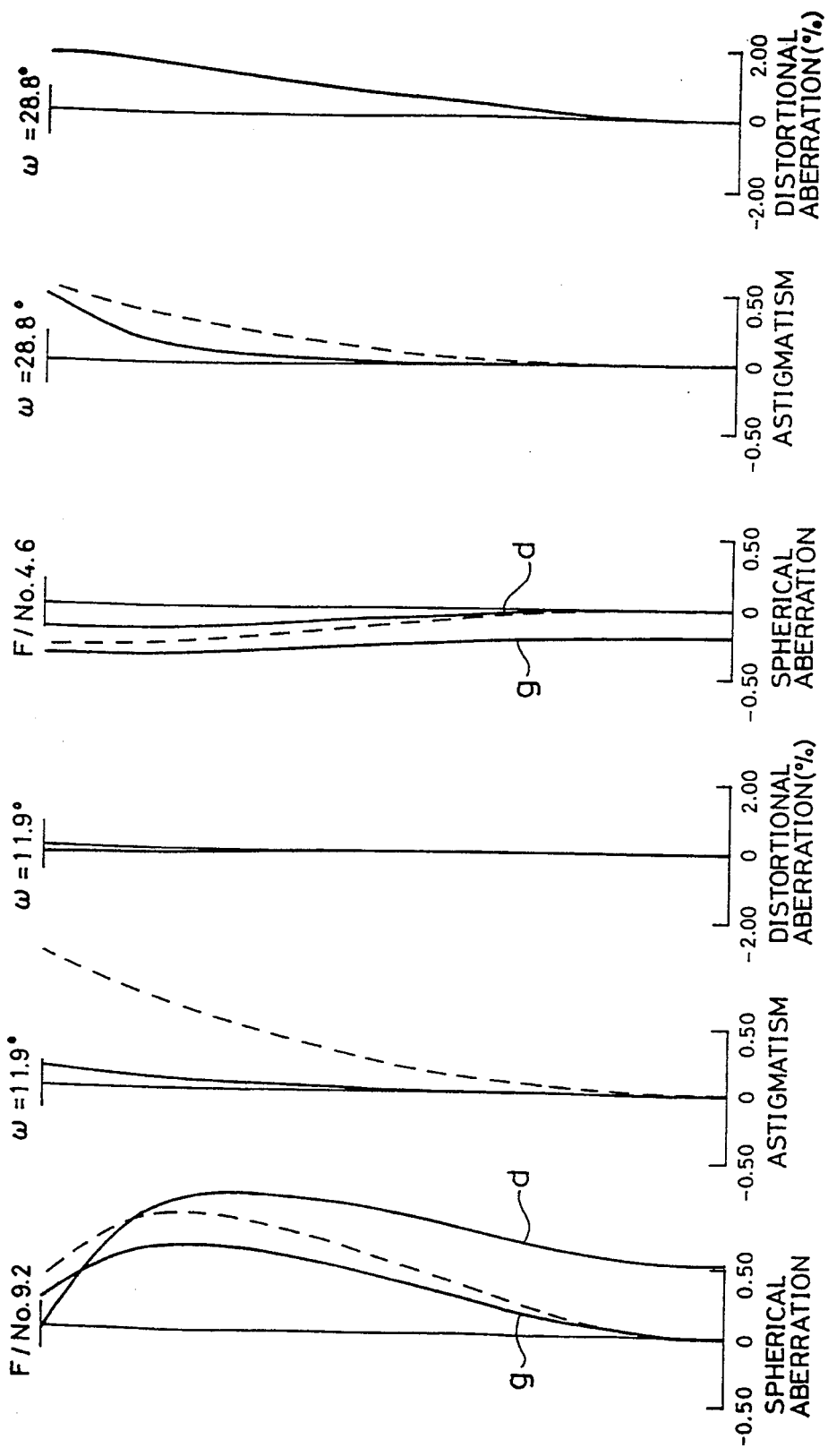

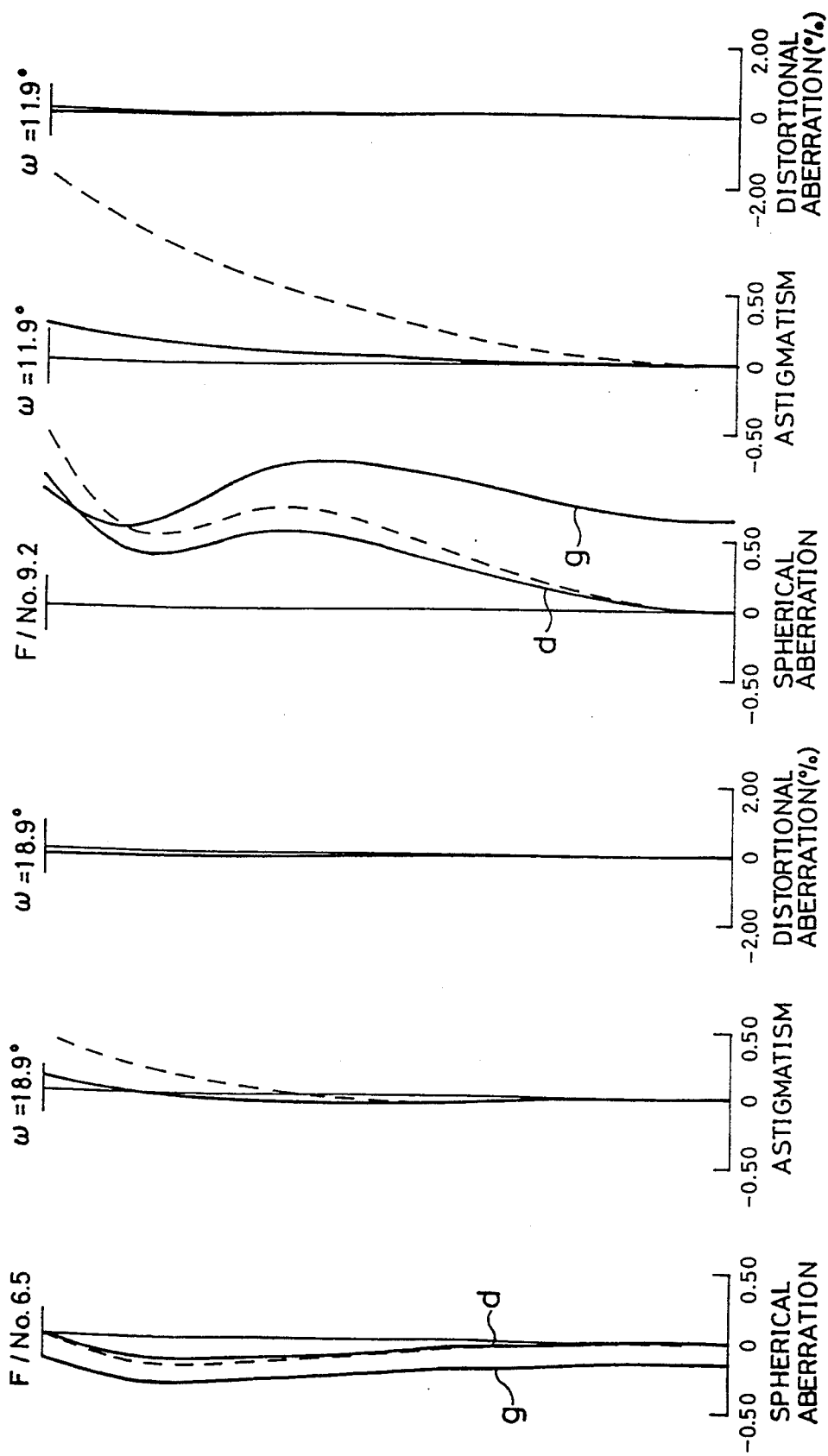

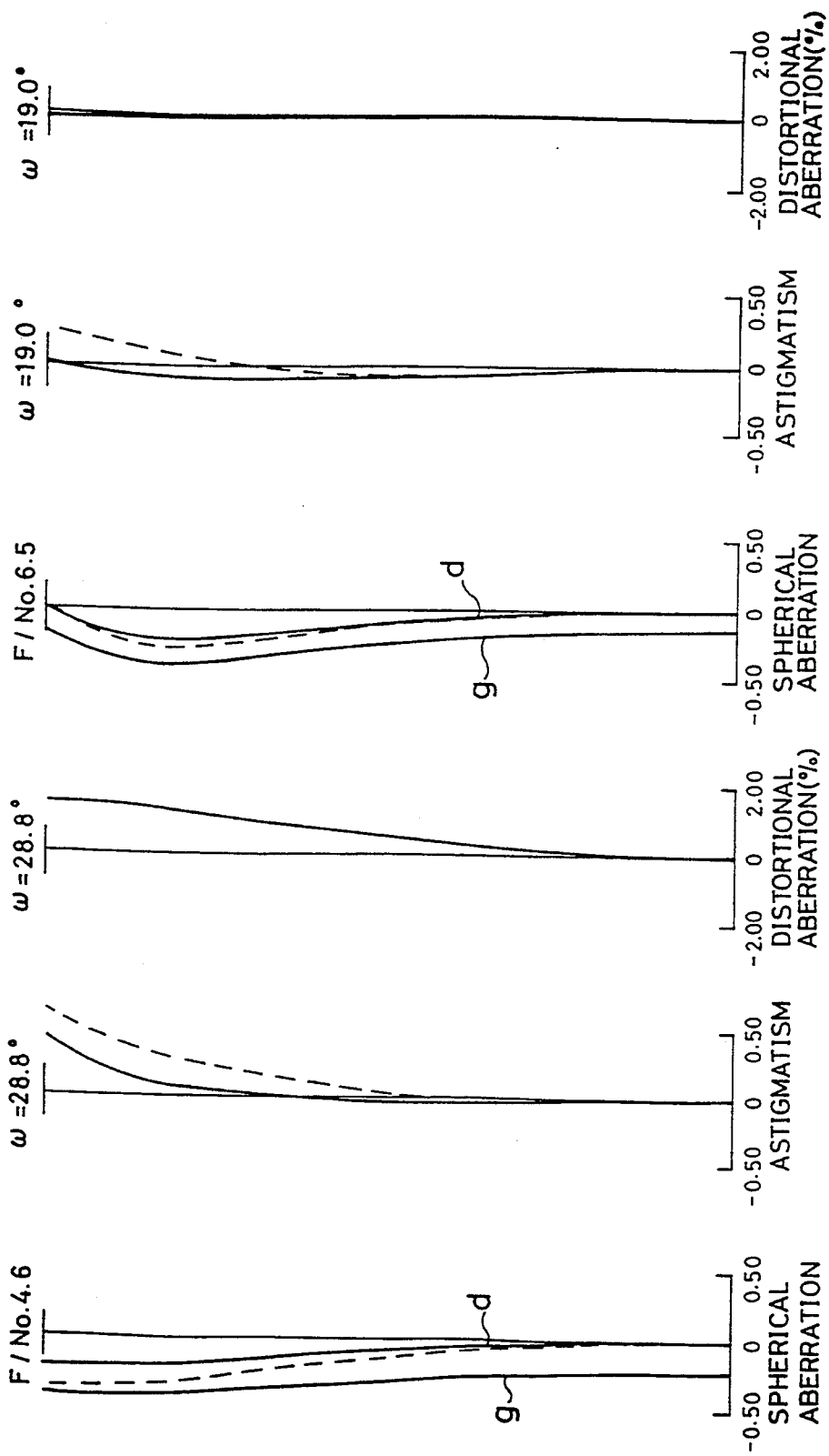

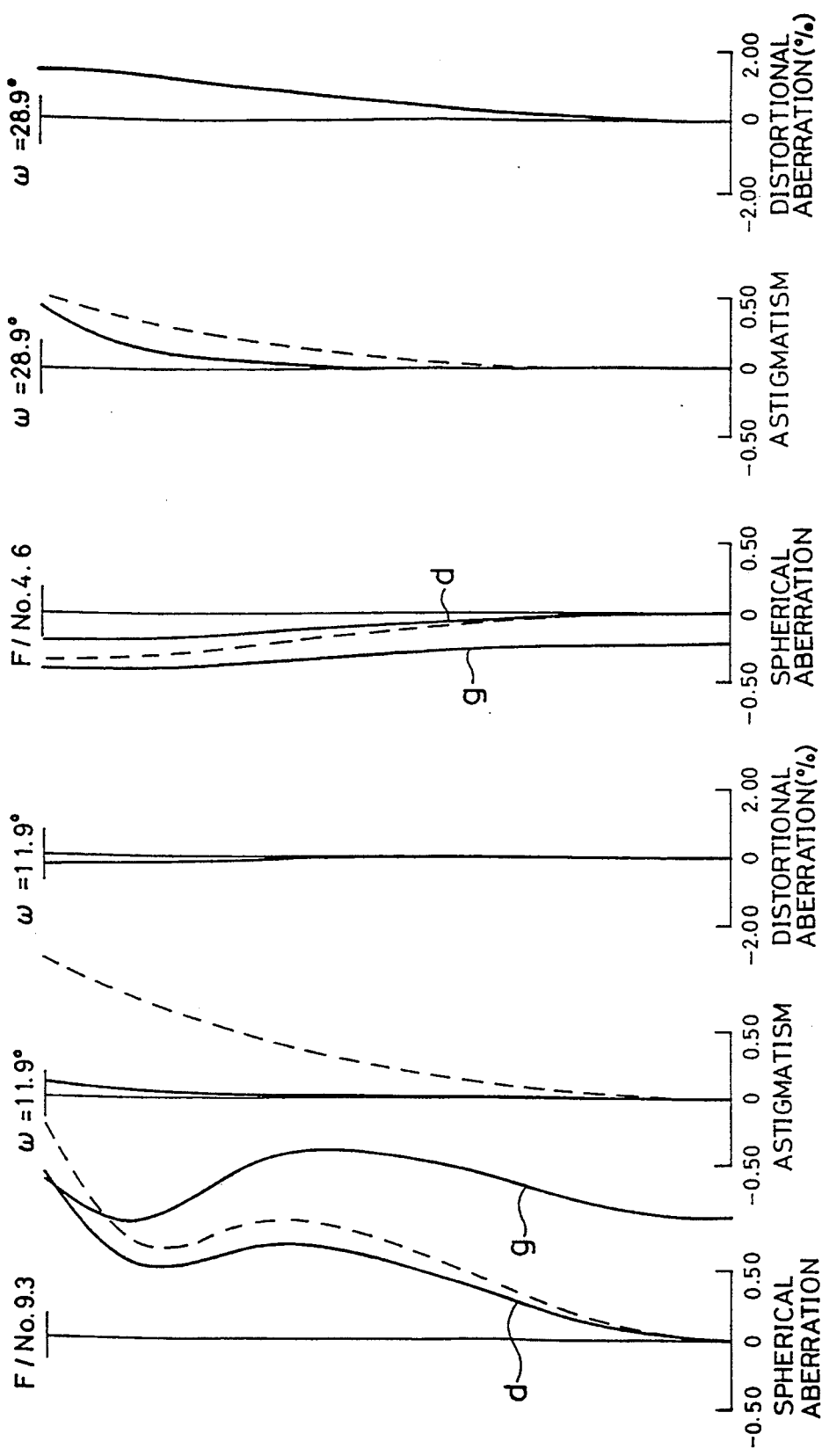

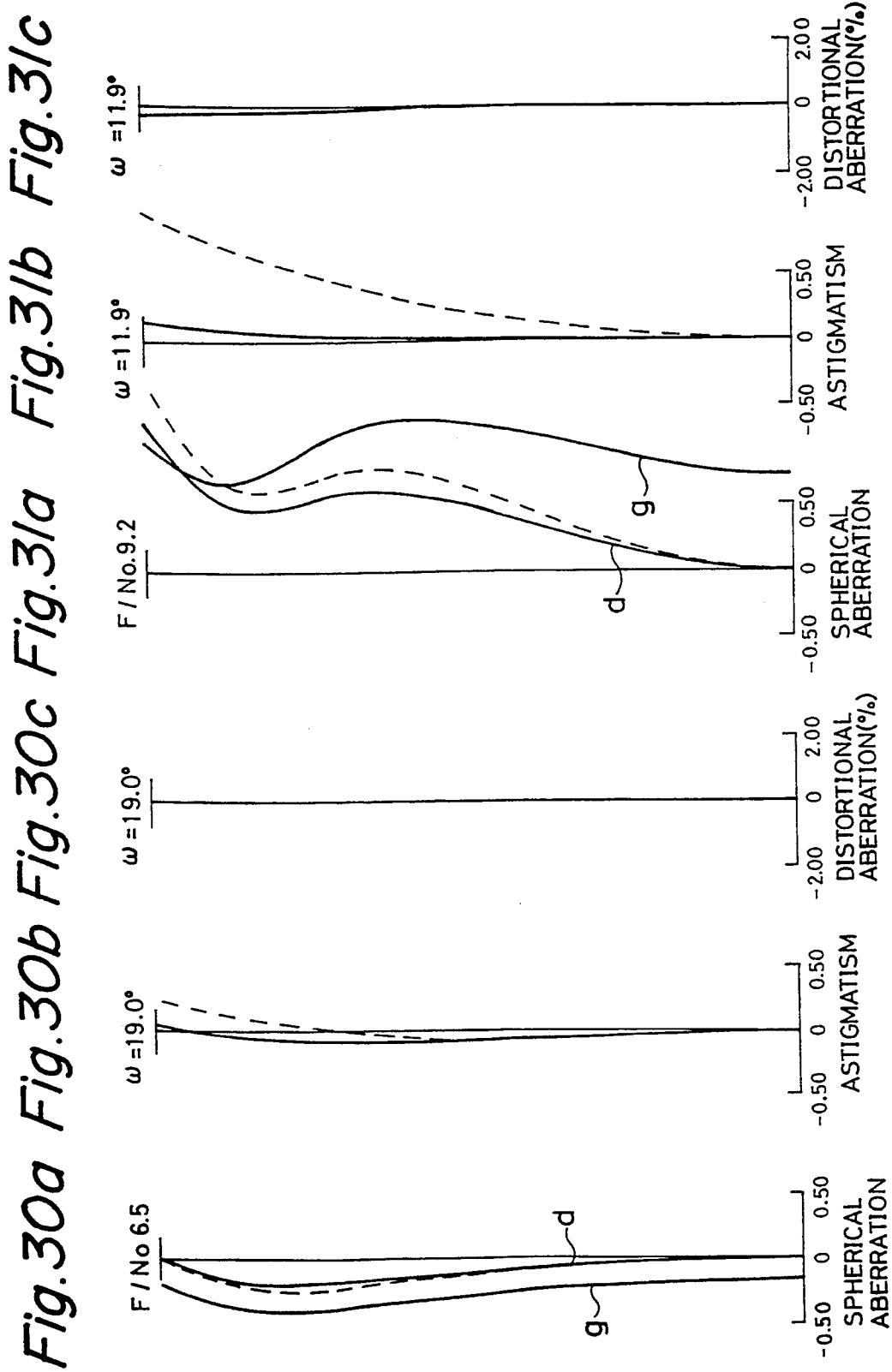

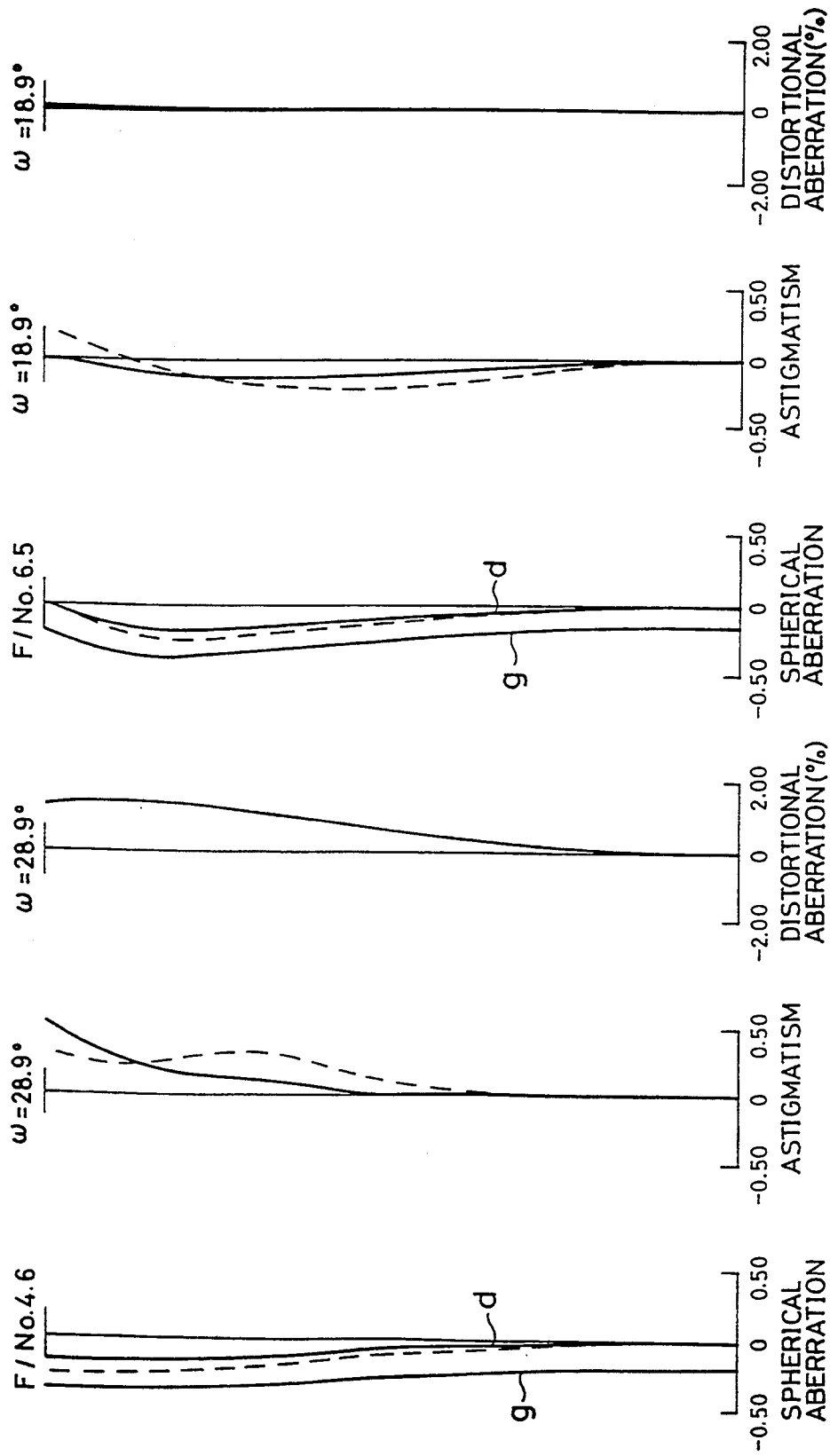

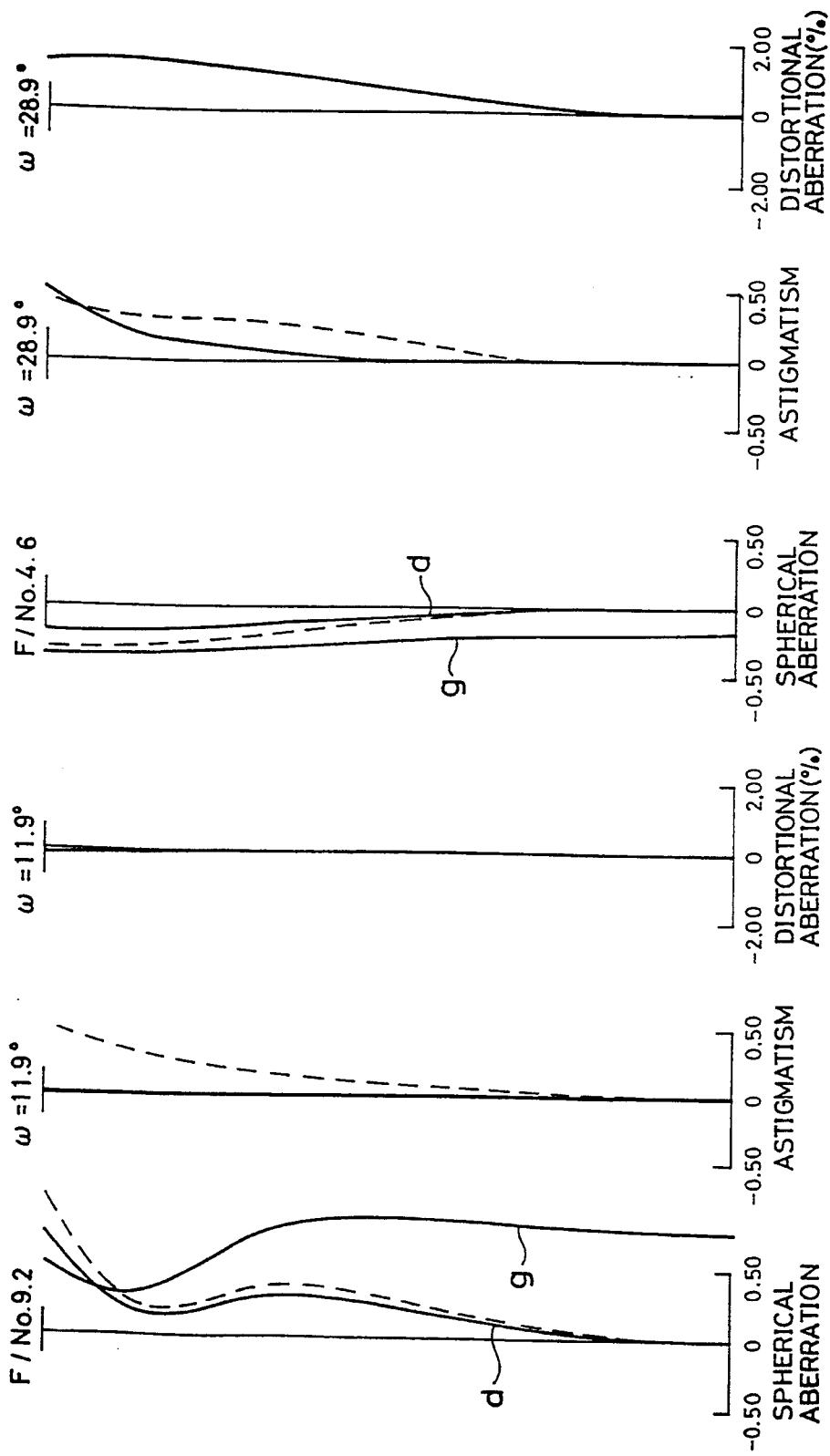

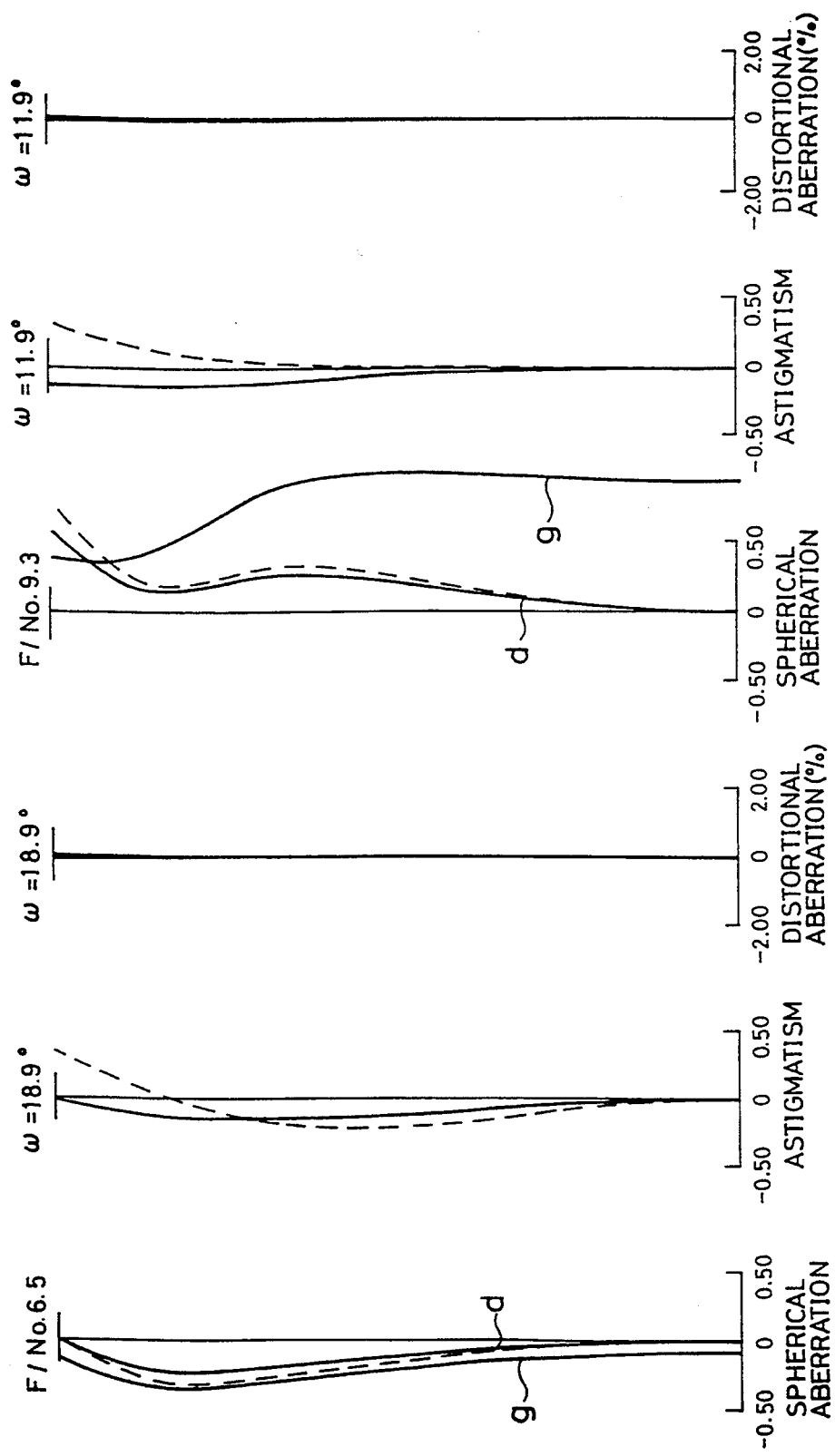

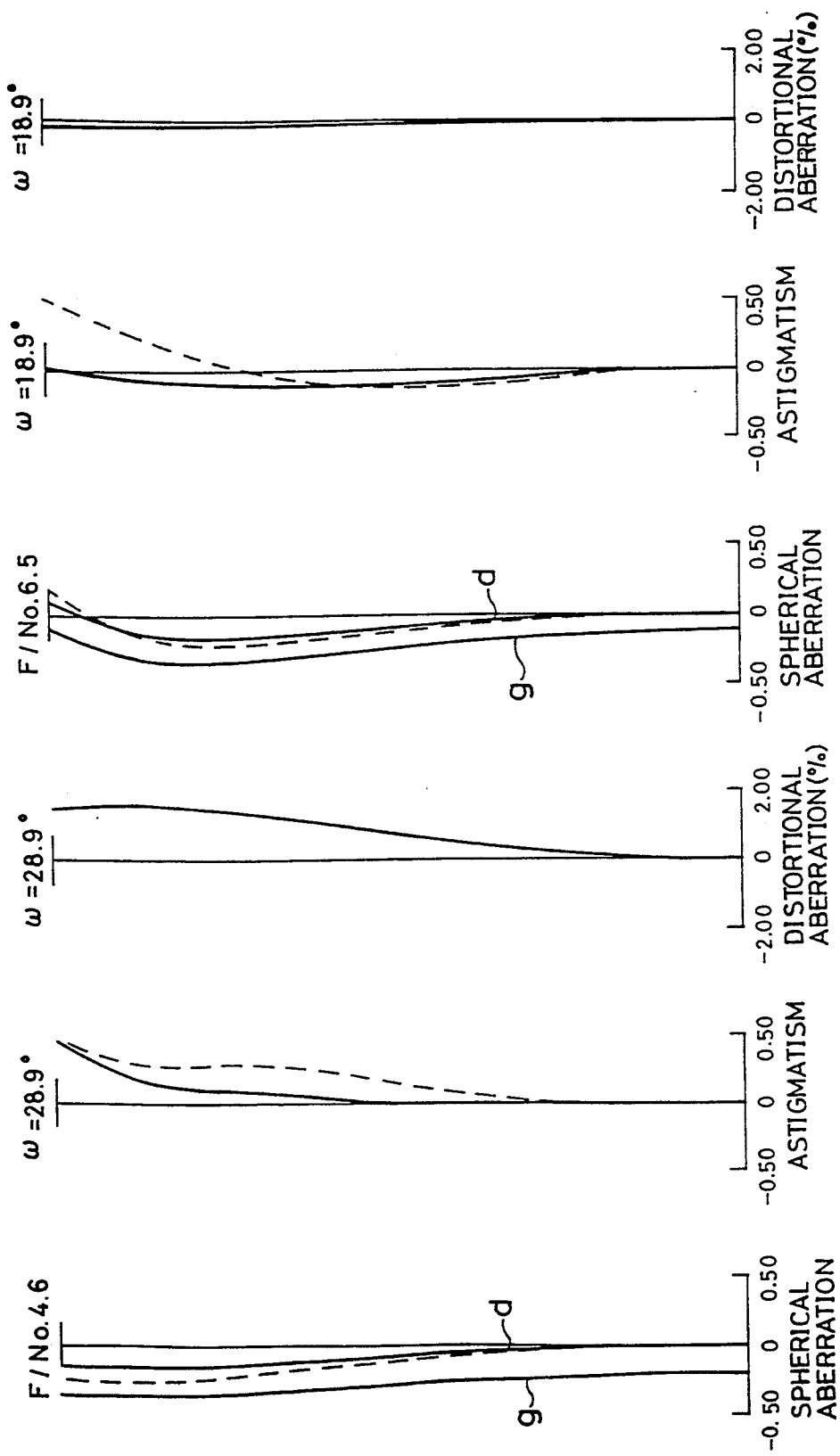

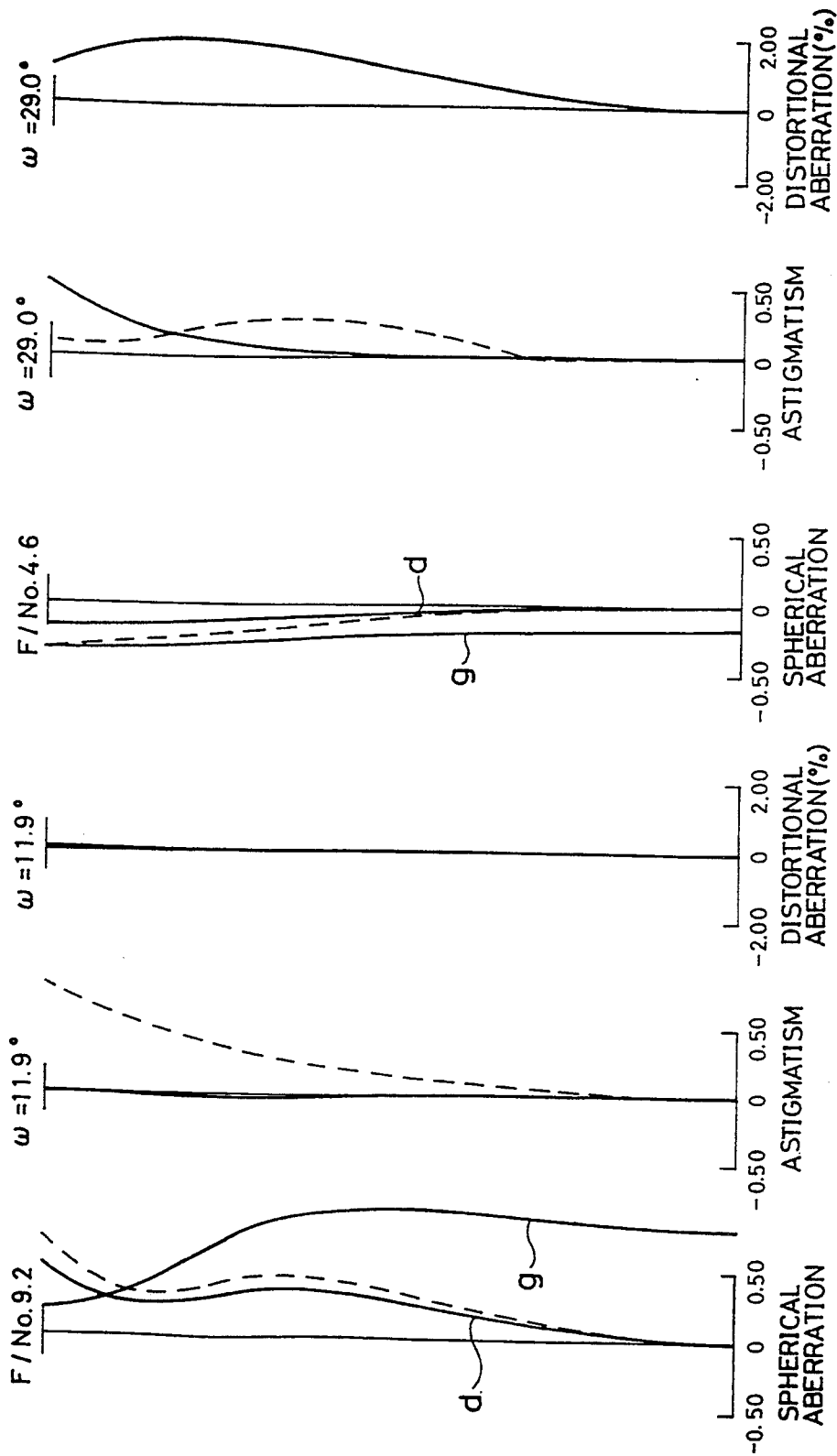

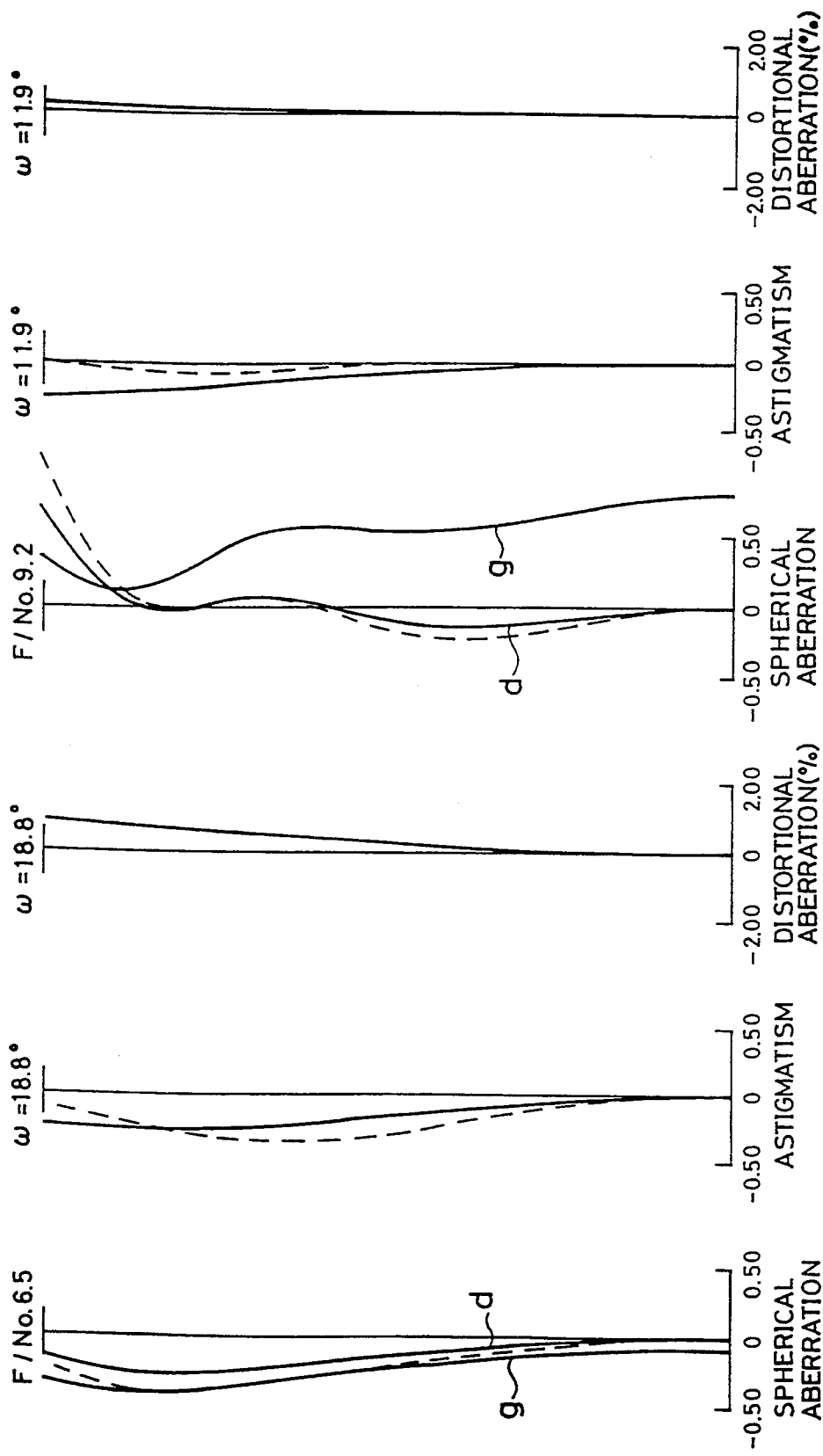

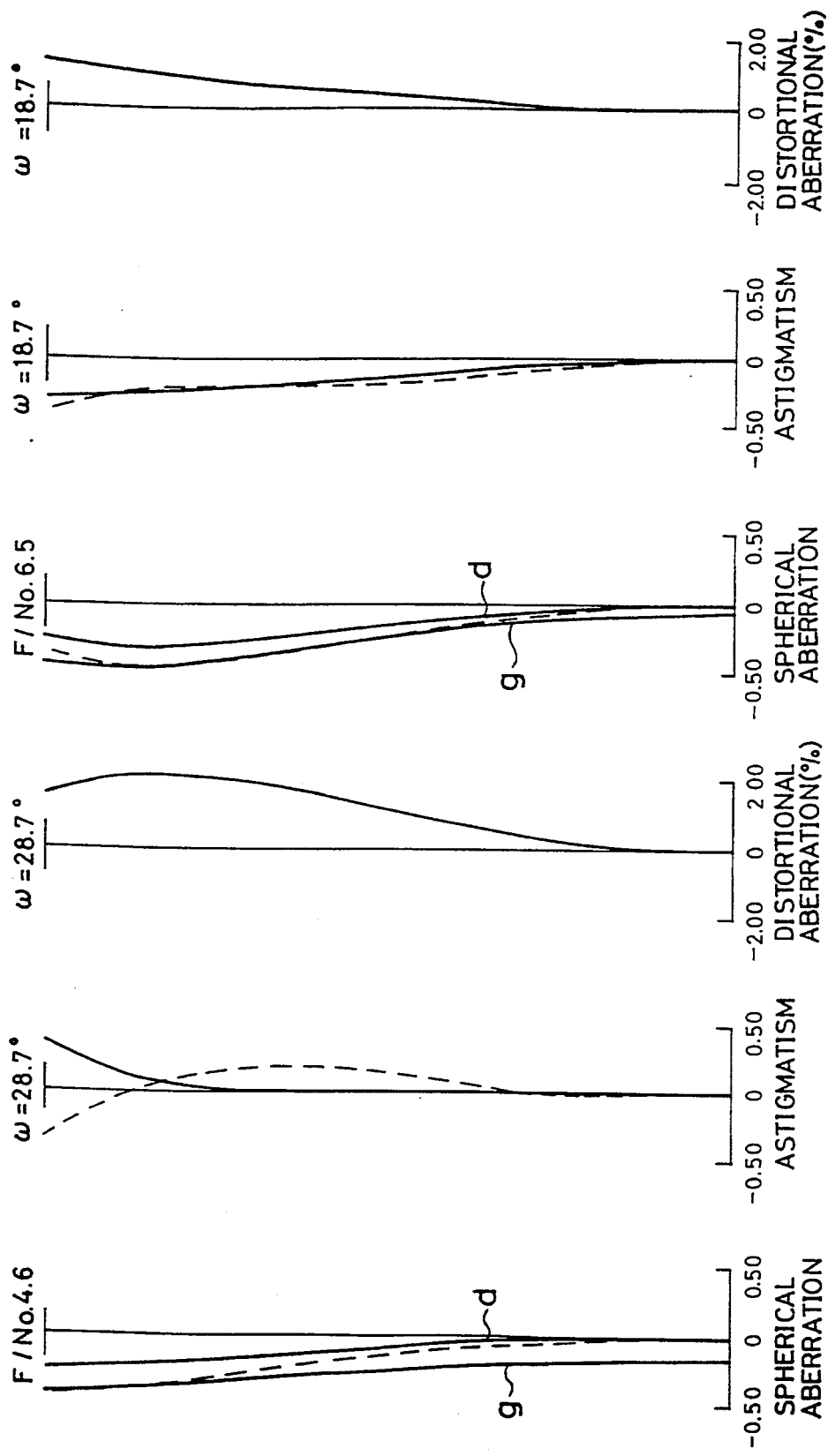

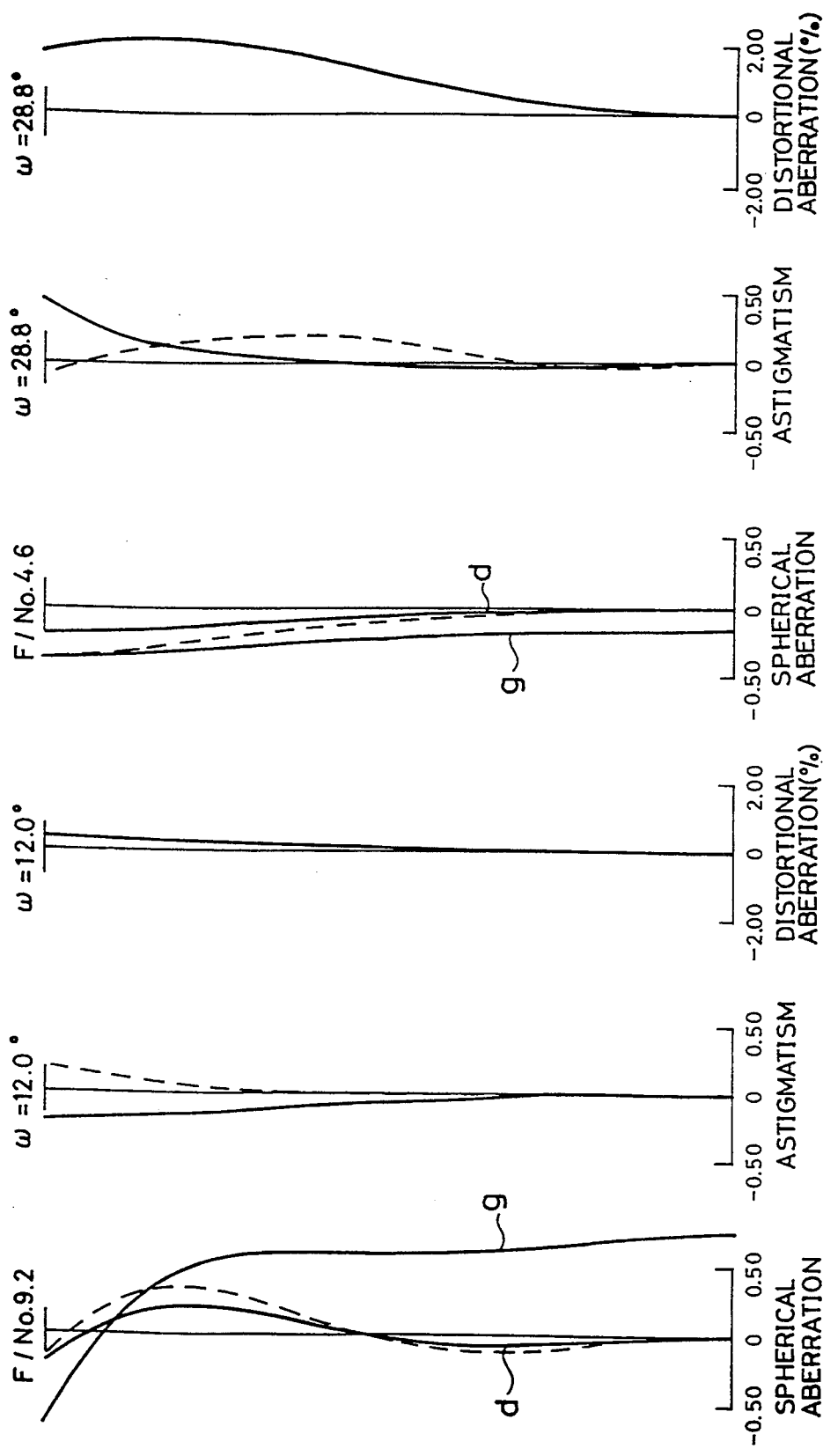

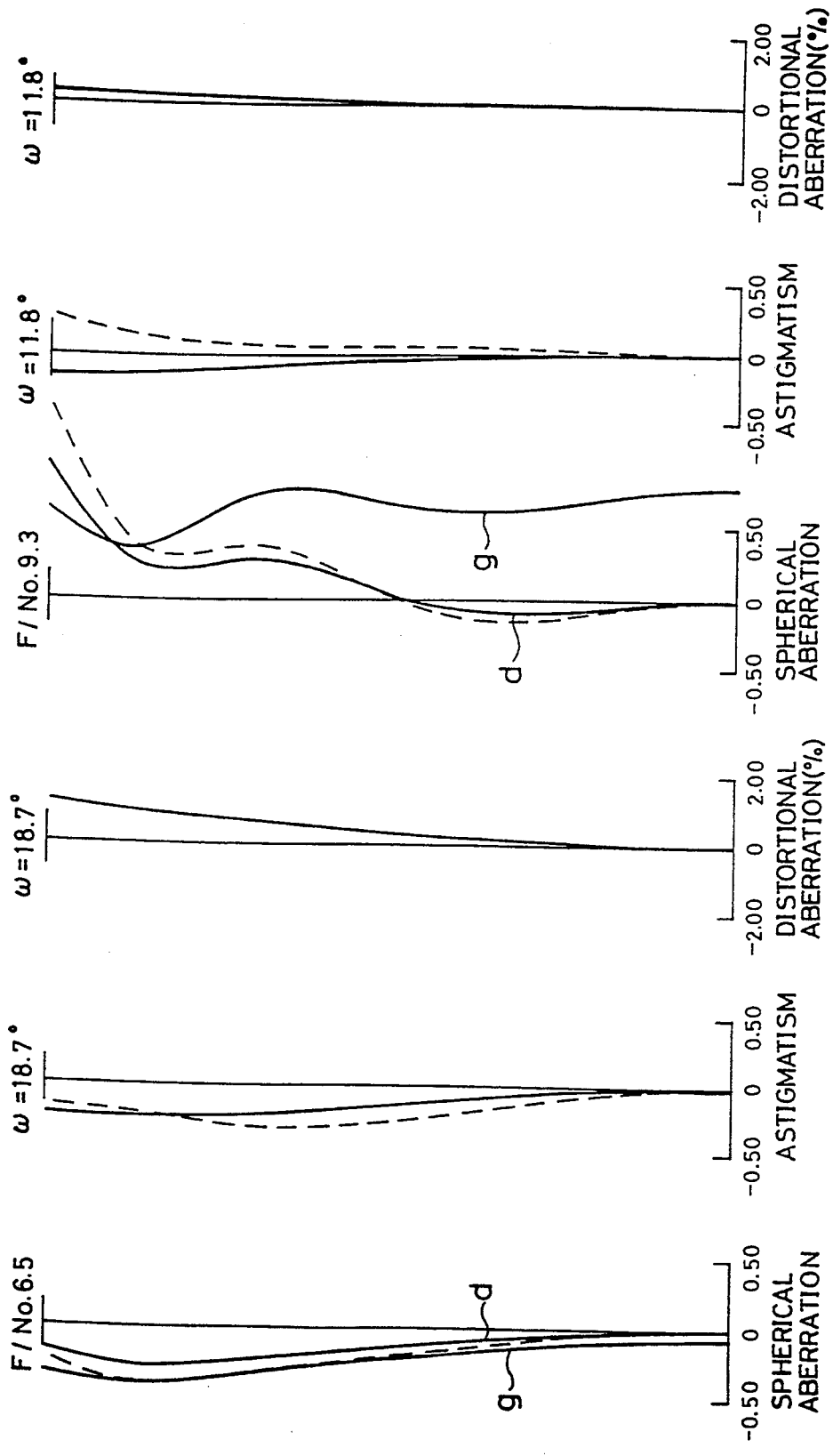

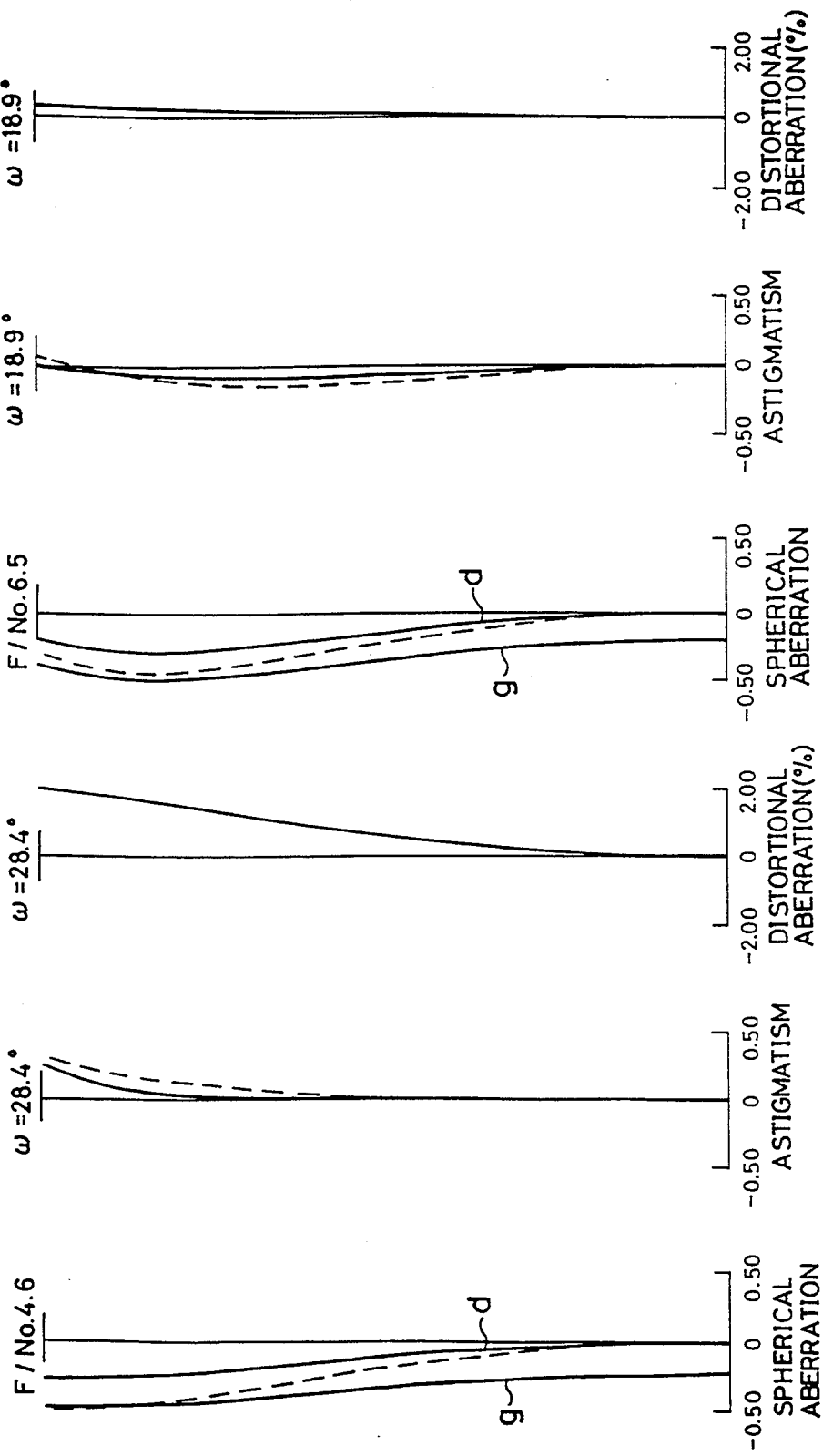

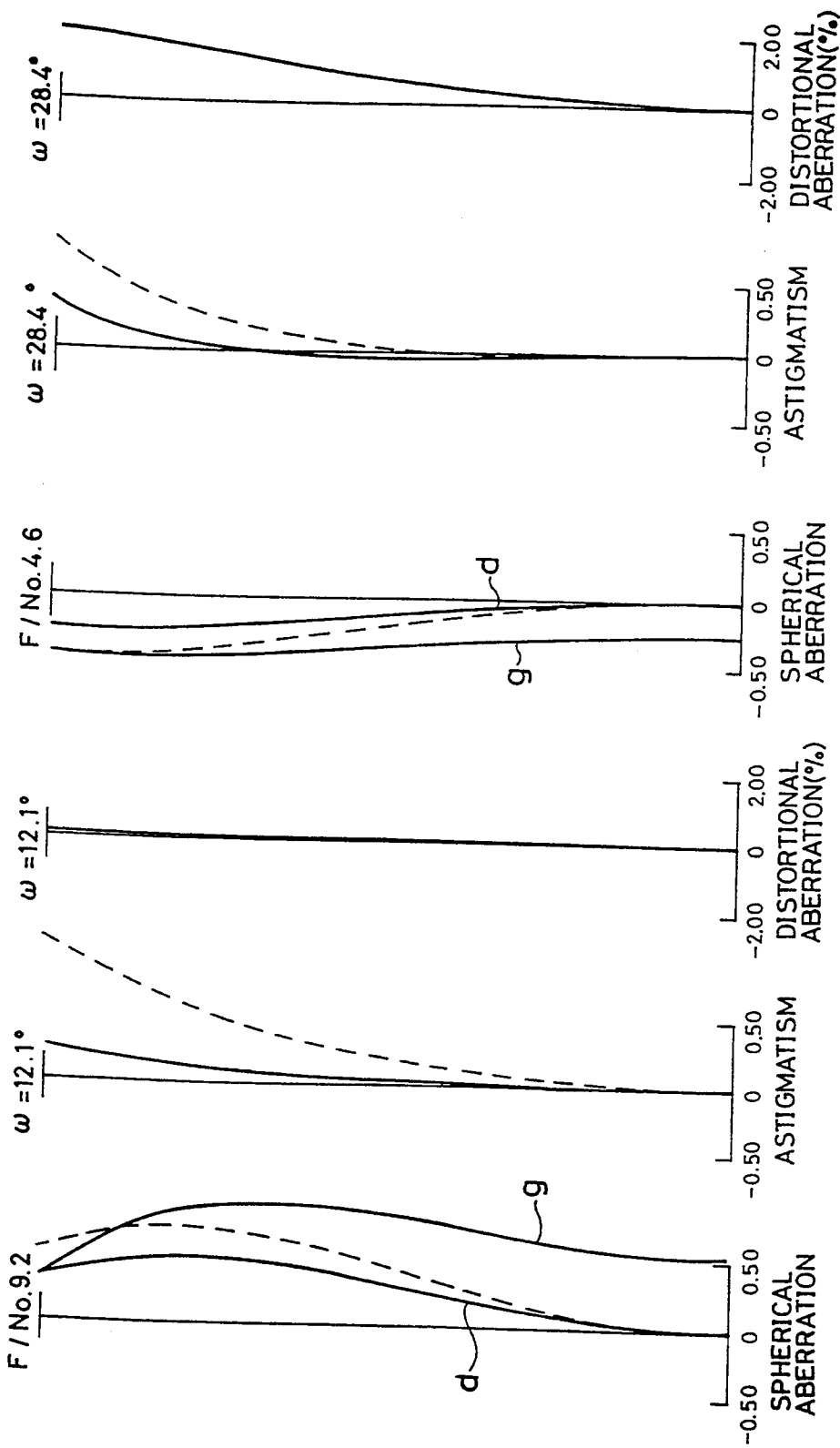

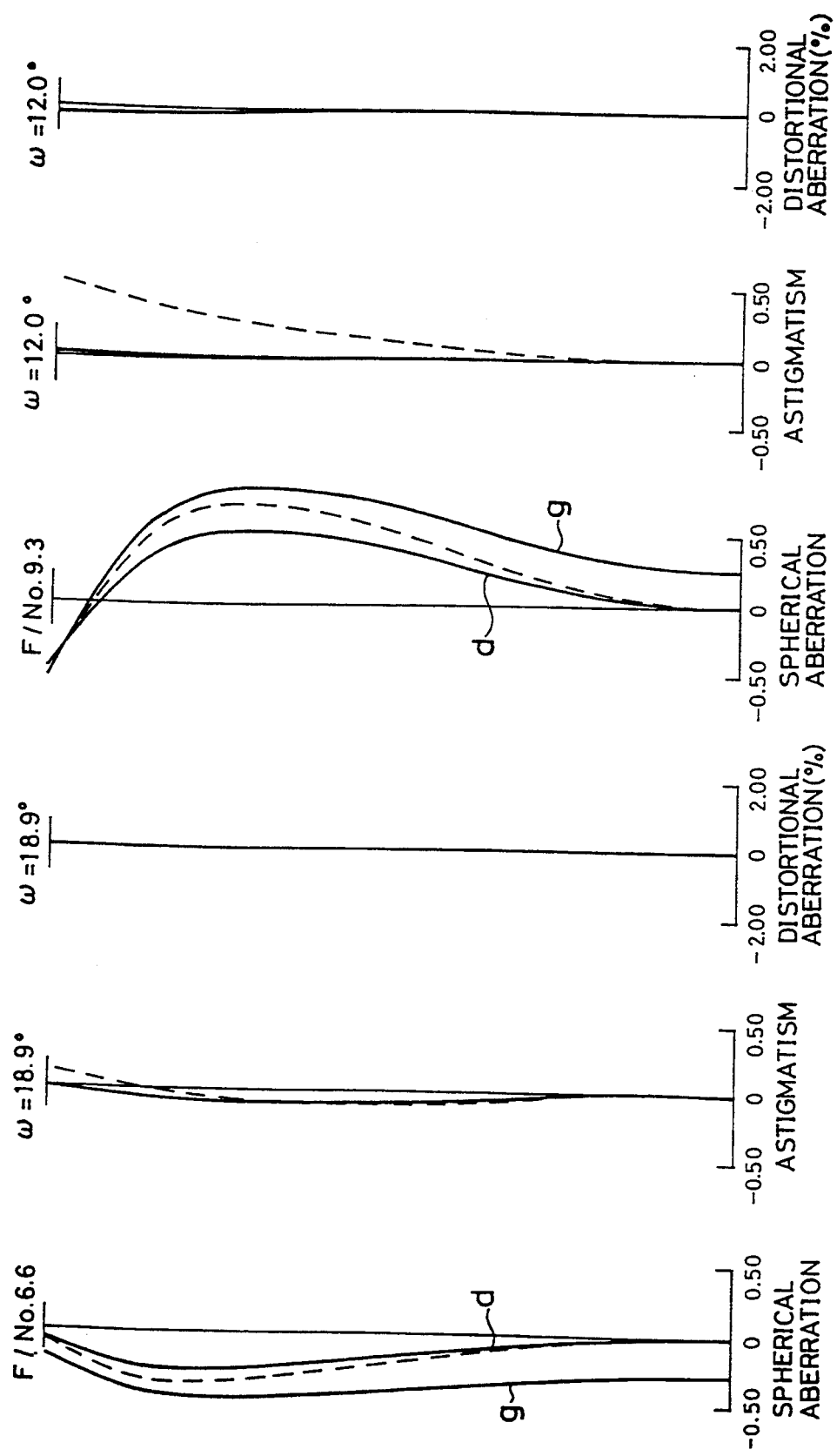

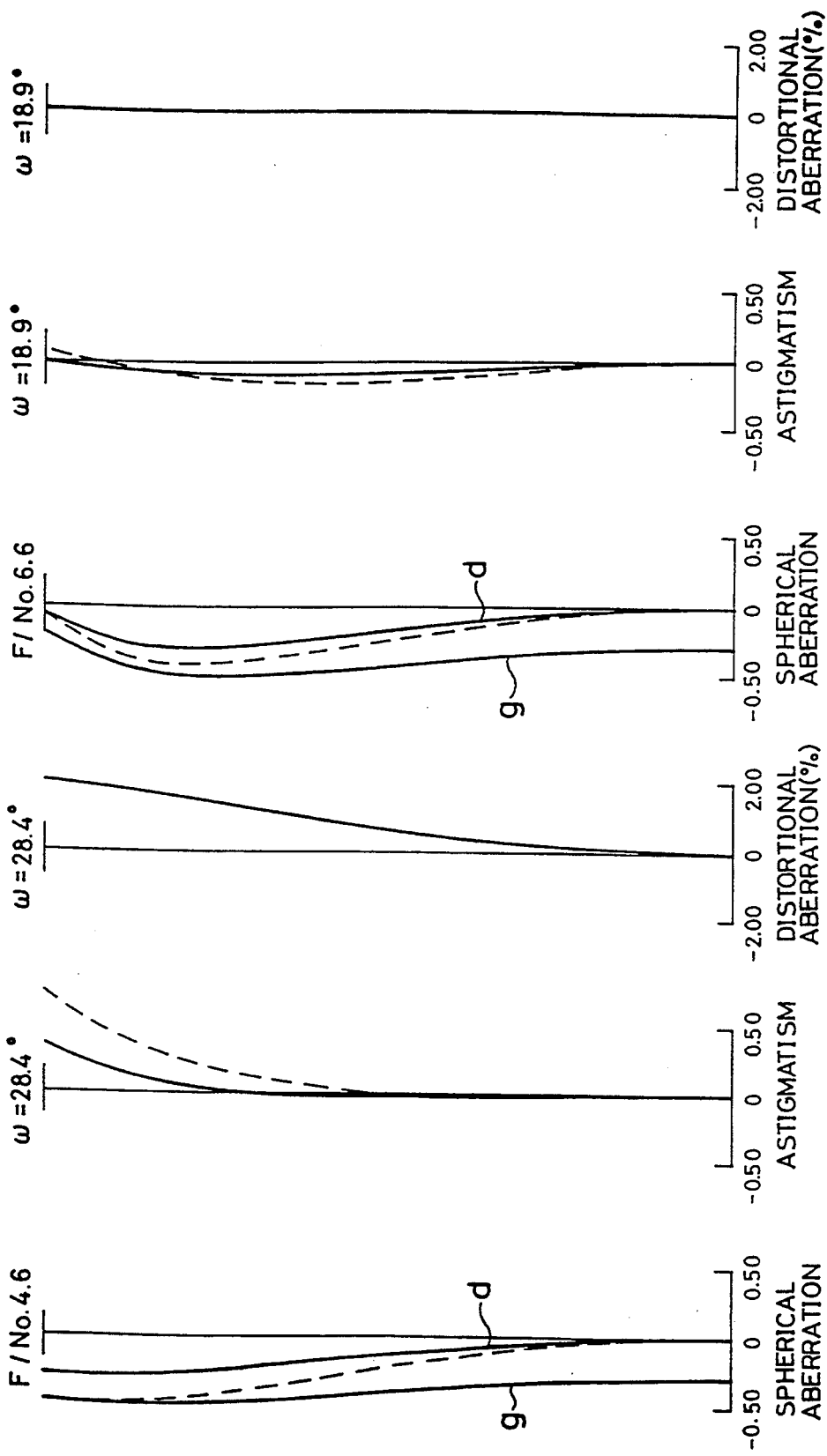

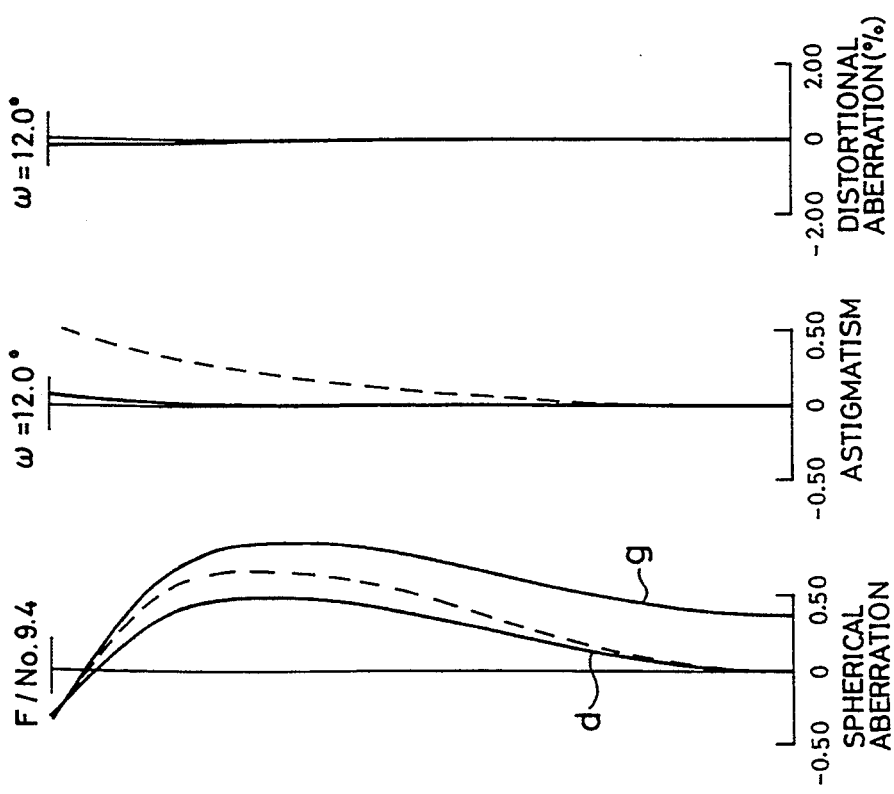

ZOOM LENS

BACKGROUND OF THE INVENTION

1. Field of the Invention

The present invention relates to a zoom lens constructed by two lens groups. The present invention can be utilized in a zoom lens for taking a photograph in a lens shutter camera and a zoom lens for a video camera.

2. Description of the Related Art

Recently, a zoom lens having a high magnification has been arranged in a lens shutter camera and a video camera. It is desirable to provide a high magnification equal to 2.5 times or more for the zoom lens disposed in the lens shutter camera and the video camera.

Japanese Patent Application Laying Open (KOKAI) No. 2-50118 shows a zoom lens constructed by two lens groups and having a zoom ratio equal to 2.5 times or more. This zoom lens has a simplified zooming mechanism and is cheaply manufactured. However, this zoom lens is constructed by many lenses such as ten or eleven lenses and a back focus is extremely short. Therefore, a lens near an image face is large-sized and no zoom lens can be made compact.

SUMMARY OF THE INVENTION

It is therefore an object of the present invention to provide a compact zoom lens constructed by a small number of lenses such as seven lenses and including a wide field angle providing a half field angle about 30 degrees and having a zoom ratio equal to 2.5 times or more and constructed by two lenses.

In accordance with a first arrangement of the present invention, the above object of the present invention can be achieved by a zoom lens constructed by two lens groups in which a first lens group having a positive focal length is arranged on an object side and a second lens group having a negative focal length is arranged on an image side and a zooming operation is performed by changing a distance between the first and second lens groups; the first lens group having first to fourth lenses sequentially arranged from the object side toward the image side; the first lens being constructed by a positive meniscus lens having a convex face directed onto the object side; the second lens being constructed by a bi-concave lens; the third lens being constructed by a positive lens; and the fourth lens being constructed by a biconvex lens; the second lens group having fifth to seventh lenses sequentially arranged from the object side toward the image side; the fifth lens being constructed by a positive meniscus lens having a convex face directed onto the image side; the sixth lens being constructed by a negative meniscus lens having a convex face directed onto the image side; and the seventh lens being constructed by a negative meniscus lens having a convex face directed onto the image side; a combined focal length $f_W$ of an entire lens system at a short focal point end thereof, a combined focal length $f_T$ of the entire lens system at a long focal point end thereof, a focal length $f_1$ of the first lens group, a focal length $f_2$ of the second lens group, a thickness $d_3$ of the second lens on an optical axis of the lens system, and a thickness $d_5$ of the third lens on the optical axis of the lens system satisfying the following conditions, $$0.25 < f_1/f_T < 0.28 \qquad (1\text{-}1)$$

$$f_2/f_1 > 0.95 \qquad (1\text{-}2)$$

$$(d_3 + d_5)/f_W > 0.30. \qquad (1\text{-}3)$$

In accordance with a second arrangement of the present invention, the above object of the present invention can be achieved by a zoom lens constructed by two lens groups in which a first lens group having a positive focal length is arranged on an object side and a second lens group having a negative focal length is arranged on an image side and a zooming operation is performed by changing a distance between the first and second lens groups; the first lens group having first to fourth lenses sequentially arranged from the object side toward the image side; the first lens being constructed by a positive meniscus lens having a convex face directed onto the object side; the second lens being constructed by a bi-concave lens; the third lens being constructed by a positive lens; and the fourth lens being constructed by a biconvex lens; the second lens group having fifth to seventh lenses sequentially arranged from the object side toward the image side; the fifth lens being constructed by a positive meniscus lens having a convex face directed onto the image side; the sixth lens being constructed by a negative meniscus lens having a convex face directed onto the image side; and the seventh lens being constructed by a negative meniscus lens having a convex face directed onto the image side; an image side lens face of the fourth lens being constructed by an aspherical surface; and a focal length $f_T$ of an entire lens system at a long focal point end thereof, a focal length $f_1$ of the first lens group and a focal length $f_2$ of the second lens group satisfying the following conditions, $$0.26 < f_1/f_T < 0.29 \qquad (3\text{-}1)$$

$$f_2/f_1 > -1.0. \qquad (3\text{-}2)$$

In accordance with a third arrangement of the present invention, the above object of the present invention can be achieved by a zoom lens constructed by two lens groups in which a first lens group having a positive focal length is arranged on an object side and a second lens group having a negative focal length is arranged on an image side and a zooming operation is performed by changing a distance between the first and second lens groups; the first lens group having first to fourth lenses sequentially arranged from the object side toward the image side; the first lens being constructed by a positive meniscus lens having a convex face directed onto the object side; the second lens being constructed by a bi-concave lens; the third lens being constructed by a positive lens; and the fourth lens being constructed by a biconvex lens; the second lens group having fifth to seventh lenses sequentially arranged from the object side toward the image side; the fifth lens being constructed by a positive meniscus lens having a convex face directed onto the image side; the sixth lens being constructed by a negative meniscus lens having a convex face directed onto the image side; and the seventh lens being constructed by a negative meniscus lens having a convex face directed onto the image side; each of image side lens faces of the fourth and fifth lenses being constructed by an aspherical surface; and a focal length $f_T$ of an entire lens system at a long focal point end thereof, a focal length $f_1$ of the first lens group and a focal length $f_2$ of the second lens group satisfying the following conditions, $$0.25 < f_1/f_T < 0.28 \tag{1-1}$$

$$f_2/f_1 > -0.95. \tag{1-2}$$

In accordance with a fourth arrangement of the present invention, the above object of the present invention can be achieved by a zoom lens constructed by two lens groups in which a first lens group having a positive focal length is arranged on an object side and a second lens group having a negative focal length is arranged on an image side and a zooming operation is performed by changing a distance between the first and second lens groups; the first lens group having first to fourth lenses sequentially arranged from the object side toward the image side; the first lens being constructed by a positive meniscus lens having a convex face directed onto the object side; the second lens being constructed by a biconcave lens; the third lens being constructed by a positive lens; and the fourth lens being constructed by a biconvex lens; the second lens group having fifth to seventh lenses sequentially arranged from the object side toward the image side; the fifth lens being constructed by a positive meniscus lens having a convex face directed onto the image side; the sixth lens being constructed by a negative meniscus lens having a convex face directed onto the image side; and the seventh lens being constructed by a negative meniscus lens having a convex face directed onto the image side; each of an image side lens face of the fourth lens, and object and image side lens faces of the fifth lens being constructed by an aspherical surface; and a focal length $f_T$ of an entire lens system at a long focal point end thereof, a focal length $f_1$ of the first lens group and a focal length $f_2$ of the second lens group satisfying the following conditions, $$0.24 < f_1/f_T < 0.27 \tag{13-1}$$

$$f_2/f_1 > -0.90. \tag{13-2}$$

In accordance with a fifth arrangement of the present invention, the above object of the present invention can be achieved by a zoom lens constructed by two lens groups in which a first lens group having a positive focal length is arranged on an object side and a second lens group having a negative focal length is arranged on an image side and a zooming operation is performed by changing a distance between the first and second lens groups; the first lens group having a first lens, a joining lens and a fourth lens sequentially arranged from the object side toward the image side; the first lens being constructed by a positive meniscus lens having a convex face directed onto the object side; the joining lens being constructed by a second lens as a biconcave lens and a third lens as a biconvex lens; and the fourth lens being constructed by a biconvex lens; the second lens group having fifth to seventh lenses sequentially arranged from the object side toward the image side; the fifth lens being constructed by a positive meniscus lens having a convex face directed onto the image side; the sixth lens being constructed by a negative meniscus lens having a convex face directed onto the image side; and the seventh lens being constructed by a negative meniscus lens having a convex face directed onto the image side; a combined focal length $f_W$ of an entire lens system at a short focal point end thereof, a combined focal length $f_T$ of the entire lens system at a long focal point end thereof, a focal length $f_1$ of the first lens group, a focal length $f_2$ of the second lens group, a thickness $d_3$ of the second lens on an optical axis of the lens system, and a thickness $d_4$ of the third lens on the optical axis of the lens system satisfying the following conditions, $$0.24 < f_1/f_T < 0.28 \tag{20-1}$$

$$f_2/f_1 > -0.95 \tag{1-2}$$

$$(d_3+d_4)/f_W > 0.26. \tag{20-3}$$

As mentioned above, the zoom lens in the present invention is of a so-called telephoto type and is constructed by two lens groups composed of a first lens group having a positive focal length and a second lens group having a negative focal length. In such a structure, a back focus is reduced and it is possible to realize a compact zoom lens having a simplified structure and suitable for a camera such as a lens shutter camera in which there is no restriction of the back focus.

In this zoom lens of the telephoto type constructed by the two lens groups, the first and second lens groups approach each other most closely at a long focal point end of the zoom lens. The back focus is shortest at a short focal point end of the zoom lens. In the present invention, refracting powers of four lenses in the first lens group are set to be positive, negative, positive and positive from an object side toward an image side. Thus, a rear principal point of the first lens group is located on the image side as much as possible so that a distance between the rear principal point of the first lens group and a front principal point of the second lens group at the long focal point end of the zoom lens is reduced to secure a large zoom ratio.

The zoom lens having each of first, second, twentieth and twenty-second lens structures is constructed by only a spherical lens. The zoom lens having each of third to nineteenth lens structures includes an aspherical surface.

It is necessary to increase refracting powers of the first and second lens groups so as to restrain an increase in entire length of the above zoom lens of the telephoto type constructed by the two lens groups. The above conditional formulas (1-1), (3-1), (13-1) and (20-1) are conditions for restricting the refracting power of the first lens group. When a parameter $f_1/f_T$ in each of these conditional formulas exceeds an upper limit thereof, the entire length of the zoom lens is excessively increased so that no zoom lens can be made compact. In contrast to this, when this parameter exceeds a lower limit thereof, a Petzval's sum is excessively reduced so that an image face is moved on a positive refracting power side and performance of the zoom lens outside the optical axis thereof is reduced.

It is necessary to reduce moving amounts of the lens groups at a zooming time of the zoom lens so as to increase the zoom ratio while the increase in entire length of the zoom lens is restrained, and so as not to extremely reduce the back focus at the short focal point end of the zoom lens. To reduce the moving amount of the second lens group relative to the first lens group at the zooming time, it is necessary to increase negative refracting power of the second lens group in comparison with positive refracting power of the first lens group.

The conditional formulas (1-2), (3-2) and (13-2) restrict a ratio of the refracting powers of the first and second lens groups. When a parameter $f_2/f_1$ in each of these conditional formulas exceeds a lower limit thereof, the moving amount of the second lens group relative to the first lens group is increased so that the entire length of the zoom lens is excessively increased and the back focus is extremely reduced at the short focal point end of the zoom lens.

The above conditional formulas I1-1), I3-1), (13-1) and I20-1) and the above conditional formulas (1-2), (3-2) and (1.3-2) have the respective common parameters. However, the upper and lower limit values of the parameters are different from each other in accordance with use or nonuse of aspherical surfaces, the number of used aspherical surfaces and using positions of the aspherical surfaces.

The condition (1-3) about the zoom lens having the first lens structure and the condition (20-3) about the zoom lens having the twentieth lens structure restrict thicknesses of the second and third lenses on the optical axis of the zoom lens. When a parameter $(d_3+d_5)/f_W$ or $(d_3+d_4)/f_W$ in these conditions exceeds a lower limit thereof, spherical aberration is caused on a negative refracting power side so that no image face on the optical axis is in conformity with the image face outside the optical axis.

The entire length of the zoom lens having each of the third to nineteenth lens structures is further reduced by using an aspherical lens surface. In the zoom lens having each of the third to nineteenth lens structures, an image side lens face of the fourth lens is commonly constructed by an aspherical surface. When the image side face of the fourth lens is set to the aspherical surface, it is preferable to satisfy the condition (4-1) in accordance with each of the fourth, seventh and fourteenth lens structures. This condition (4-1) means that the aspherical surface used as the image side lens face of the fourth lens has a shape formed such that positive refracting power is decreased from the optical axis of the zoom lens toward a peripheral portion of the zoom lens. When the aspherical surface having such a shape is used, it is possible to effectively remove spherical aberration caused by reducing the entire length of the zoom lens.

In the zoom lens having each of the sixth to nineteenth lens structures, the image side lens face of the fourth lens and an image side lens face of the fifth lens are set to aspherical surfaces.

The condition (8-1) in each of the eighth and ninth lens structures means that the aspherical surface used as the image side lens face of the fifth lens has a shape formed such that positive refracting power is increased from the optical axis of the zoom lens toward a peripheral portion of the zoom lens. When the aspherical surface having such a shape is used, it is possible to more effectively remove field curvature and astigmatism caused by reducing the entire length of the zoom lens.

In the zoom lens having each of the thirteenth to nineteenth lens structures, the image side lens face of the fourth lens, the object and image side lens faces of the fifth lens are commonly set to aspherical surfaces. When the three aspherical surfaces are used in such a combination, it is preferable to satisfy the condition (15-1) with respect to the shape of the fifth lens. This condition (15-1) means that the shape of the fifth lens is formed such that positive refracting power is increased from the optical axis toward a peripheral portion. When the fifth lens having such a shape is used, it is possible to more effectively remove field curvature and astigmatism caused by reducing the entire length of the zoom lens.

In the zoom lens of the present invention, it is preferable to satisfy the conditions (2-1) and (2-2) irrespective of use or nonuse of the aspherical surfaces in accordance with each of the second, fifth, tenth, eleventh, twelfth, seventeenth, eighteenth, nineteenth and twenty-first lens structures. Further, it is preferable to satisfy the condition (2-3) in accordance with each of the second, :fifth, tenth, eleventh, twelfth, seventeenth, eighteenth, nineteenth and twenty-second lens structures.

The condition (2-1) restricts a refractive index of the second lens. The conditions (2-2) and (2-3) respectively restrict Abbe's numbers of the fourth and seventh lenses. When these conditions (2-1), (2-2) and (2-3) are satisfied, chromatic aberration and field curvature are corrected with improved balance so that a higher image forming performance can be realized.

Further objects and advantages of the present invention will be apparent from the following description of the preferred embodiments of the present invention as illustrated in the accompanying drawings.

BRIEF DESCRIPTION OF THE DRAWINGS

FIGS. 14a, 14b and 14c are diagrams respectively showing spherical aberration, astigmatism and distortional aberration at a short focal point end of the zoom lens in the Embodiment 1;

FIGS. 15a, 15b and 15c are diagrams respectively showing spherical aberration, astigmatism and distortional aberration at an intermediate focal length of the zoom lens in the Embodiment 1;

FIGS. 16a, 16b and 16c are diagrams respectively showing spherical aberration, astigmatism and distortional aberration at a long focal point end of the zoom lens in the Embodiment 1;

FIGS. 17a, 17b and 17c are diagrams respectively showing spherical aberration, astigmatism and distortional aberration at a short focal point end of the zoom lens in the Embodiment 2;

FIGS. 18a, 18b and 18c are diagrams respectively showing spherical aberration, astigmatism and distortional aberration at an intermediate focal length of the zoom lens in the Embodiment 2;

FIGS. 19a, 19b and 19c are diagrams respectively showing spherical aberration, astigmatism and distortional aberration at a long focal point end of the zoom lens in the Embodiment 2;

FIGS. 20a, 20b and 20c are diagrams respectively showing spherical aberration, astigmatism and distortional aberration at a short focal point end of the zoom lens in the Embodiment 3;

FIGS. 21a, 21b and 21c are diagrams respectively showing spherical aberration, astigmatism and distortional aberration at an intermediate focal length of the zoom lens in the Embodiment 3;

FIGS. 22a, 22b and 22c are diagrams respectively showing spherical aberration, astigmatism and distortional aberration at a long focal point end of the zoom lens in the Embodiment 3;

FIGS. 23a, 23b and 23c are diagrams respectively showing spherical aberration, astigmatism and distortional aberration at a short focal point end of the zoom lens in the Embodiment 4;

FIGS. 24a, 24b and 24c are diagrams respectively showing spherical aberration, astigmatism and distortional aberration at an intermediate focal length of the zoom lens in the Embodiment 4;

FIGS. 25a, 25b and 25c are diagrams respectively showing spherical aberration, astigmatism and distortional aberration at a long focal point end of the zoom lens in the Embodiment 4;

FIGS. 26a, 26b and 26c are diagrams respectively showing spherical aberration, astigmatism and distortional aberration at a short focal point end of the zoom lens in the Embodiment 5;

FIGS. 27a, 27b and 27c are diagrams respectively showing spherical aberration, astigmatism and distortional aberration at an intermediate focal length of the zoom lens in the Embodiment 5;

FIGS. 28a, 28b and 28c are diagrams respectively showing spherical aberration, astigmatism and distortional aberration at a long focal point end of the zoom lens in the Embodiment 5;

FIGS. 29a, 29b and 29c are diagrams respectively showing spherical aberration, astigmatism and distortional aberration at a short focal point end of the zoom lens in the Embodiment 6;

FIGS. 30a, 30b and 30c are diagrams respectively showing spherical aberration, astigmatism and distortional aberration at an intermediate focal length of the zoom lens in the Embodiment 6;

FIGS. 31a, 31b and 31c are diagrams respectively showing spherical aberration, astigmatism and distortional aberration at a long focal point end of the zoom lens in the Embodiment 6;

FIGS. 32a, 32b and 32c are diagrams respectively showing spherical aberration, astigmatism and distortional aberration at a short focal point end of the zoom lens in the Embodiment 7;

FIGS. 33a, 33b and 33c are diagrams respectively showing spherical aberration, astigmatism and distortional aberration at an intermediate focal length of the zoom lens in the Embodiment 7;

FIGS. 34a, 34b and 34c are diagrams respectively showing spherical aberration, astigmatism and distortional aberration at a long focal point end of the zoom lens in the Embodiment 7;

FIGS. 35a, 35b and 35c are diagrams respectively showing spherical aberration, astigmatism and distortional aberration at a short focal point end of the zoom lens in the Embodiment 8;

FIGS. 36a, 36b and 36c are diagrams respectively showing spherical aberration, astigmatism and distortional aberration at an intermediate focal length of the zoom lens in the Embodiment 8;

FIGS. 37a, 37b and 37c are diagrams respectively showing spherical aberration, astigmatism and distortional aberration at a long focal point end of the zoom lens in the Embodiment 8;

FIGS. 38a, 38b and 38c are diagrams respectively showing spherical aberration, astigmatism and distortional aberration at a short focal point end of the zoom lens in the Embodiment 9;

FIGS. 39a, 39b and 39c are diagrams respectively showing spherical aberration, astigmatism and distortional aberration at an intermediate focal length of the zoom lens in the Embodiment 9;

FIGS. 40a, 40b and 40c are diagrams respectively showing spherical aberration, astigmatism and distortional aberration at a long focal point end of the zoom lens in the Embodiment 9;

FIGS. 41a, 41b and 41c are diagrams respectively showing spherical aberration, astigmatism and distortional aberration at a short focal point end of the zoom lens in the Embodiment 10;

FIGS. 42a, 42b and 42c are diagrams respectively showing spherical aberration, astigmatism and distortional aberration at an intermediate focal length of the zoom lens in the Embodiment 10;

FIGS. 43a, 43b and 43c are diagrams respectively showing spherical aberration, astigmatism and distortional aberration at a long focal point end of the zoom lens in the Embodiment 10;

FIGS. 44a, 44b and 44c are diagrams respectively showing spherical aberration, astigmatism and distortional aberration at a short focal point end of the zoom lens in the Embodiment 11;

FIGS. 45a, 45b and 45c are diagrams respectively showing spherical aberration, astigmatism and distortional aberration at an intermediate focal length of the zoom lens in the Embodiment 11;

FIGS. 46a, 46b and 46c are diagrams respectively showing spherical aberration, astigmatism and distortional aberration at a long focal point end of the zoom lens in the Embodiment 11;

FIGS. 47a, 47b and 47c are diagrams respectively showing spherical aberration, astigmatism and distortional aberration at a short focal point end of the zoom lens in the Embodiment 12;

FIGS. 48a, 48b and 48c are diagrams respectively showing spherical aberration, astigmatism and distortional aberration at an intermediate focal length of the zoom lens in the Embodiment 12;

FIGS. 49a, 49b and 49c are diagrams respectively showing spherical aberration, astigmatism and distortional aberration at a long focal point end of the zoom lens in the Embodiment 12;

FIGS. 50a, 50b and 50c are diagrams respectively showing spherical aberration, astigmatism and distortional aberration at a short focal point end of the zoom lens in the Embodiment 13;

FIGS. 51a, 51b and 51c are diagrams respectively showing spherical aberration, astigmatism and distortional aberration at an intermediate focal length of the zoom lens in the Embodiment 13;

FIGS. 52a, 52b and 52c are diagrams respectively showing spherical aberration, astigmatism and distortional aberration at a long focal point end of the zoom lens in the Embodiment 13;

FIGS. 53a, 53b and 53c are diagrams respectively showing spherical aberration, astigmatism and distortional aberration at a short focal point end of the zoom lens in the Embodiment 14;

FIGS. 54a, 54b and 54c are diagrams respectively showing spherical aberration, astigmatism and distortional aberration at an intermediate focal length of the zoom lens in the Embodiment 14;

FIGS. 55a, 55b and 55c are diagrams respectively showing spherical aberration, astigmatism and distortional aberration at a long focal point end of the zoom lens in the Embodiment 14;

FIGS. 56a, 56b and 56c are diagrams respectively showing spherical aberration, astigmatism and distortional aberration at a short focal point end of the zoom lens in the Embodiment 15;

FIGS. 57a, 57b and 57c are diagrams respectively showing spherical aberration, astigmatism and distortional aberration at an intermediate focal length of the zoom lens in the Embodiment 15; and FIGS. 58a, 58b and 58c are diagrams respectively showing spherical aberration, astigmatism and distortional aberration at a long focal point end of the zoom lens in the Embodiment 15.

DESCRIPTION OF THE PREFERRED EMBODIMENTS

The preferred embodiments of a zoom lens in the present invention will next be described in detail with reference to the accompanying drawings.

Figure 1:
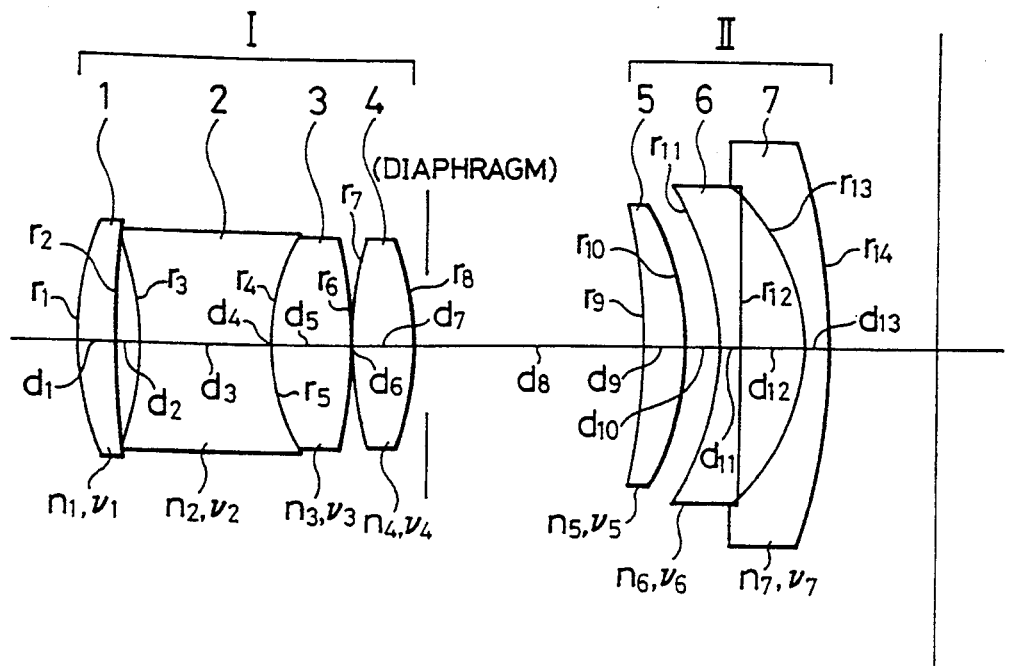
FIG. 1 is a view showing the construction of a zoom lens in accordance with Embodiment 1 of the present invention.

As shown in FIG. 1, a zoom lens having a first structure of the present invention is constructed by two lens groups in which a first lens group I having a positive focal length is arranged on an object side and a second lens group II having a negative focal length is arranged on an image side. The object and image sides are respectively on left-hand and right-hand sides in FIG. 1. A zooming operation of the zoom lens is performed by changing a distance between the first and second lens groups I and II.

The first lens group I have first to fourth lenses 1, 2, 3 and 4 sequentially arranged from the object side toward the image side. The first lens 1 is constructed by a positive meniscus lens having a convex face directed onto the object side. The second lens 2 is constructed by a biconcave lens. The third lens 3 is constructed by a positive lens. The fourth lens 4 is constructed by a biconvex lens. The second lens group II has fifth to seventh lenses 5, 6 and 7 sequentially arranged from the object side toward the image side. The fifth lens 5 is constructed by a positive meniscus lens having a convex face directed onto the image side. The sixth lens 6 is constructed by a negative meniscus lens having a convex face directed onto the image side. The seventh lens 7 is constructed by a negative meniscus lens having a convex face directed onto the image side.

In the zoom lens having the above first structure, a focal length $f_W$ of an entire lens system at a short focal point end thereof, a focal length $f_T$ of the entire lens system at a long focal point end thereof, a focal length $f_1$ of the first lens group I, a focal length $f_2$ of the second lens group II, a thickness $d_3$ of the second lens 2 on an optical axis of the lens system, and a thickness $d_5$ of the third lens 3 on the optical axis of the lens system satisfy the following conditions, $$0.25 < f_1/f_T < 0.28 \tag{1-1}$$

$$f_2/f_1 > -0.95 \tag{1-2}$$

$$(d_3 + d_5)/f_W > 0.30. \tag{1-3}$$

In a zoom lens having a second structure of the present invention, a refractive index $n_2$ of a material of the second lens 2, an Abbe's number $\nu_4$ of a material of the fourth lens 4 and an Abbe's number $\nu_7$ of a material of the seventh lens 7 satisfy the following conditions in addition to the above conditions (1-1), (1-2) and (1-3) satisfied with respect to the zoom lens having the above first structure, $$n_2 > 1.70 \tag{2-1}$$

$$\nu_4 > 65.0 \tag{2-2}$$

$$\nu_7 > 65.0. \tag{2-3}$$

In a zoom lens having a third structure of the present invention, an image side lens face of the fourth lens 4 in the above first structure is constructed by an aspherical surface. A focal length $f_T$ of the entire lens system at a long focal point end thereof, a focal length $f_1$ of the first lens group I and a focal length $f_2$ of the second lens group II satisfy the following conditions, $$0.26 < f_1/f_T < 0.29 \tag{3-1}$$

$$f_2/f_1 > -1.0. \tag{3-2}$$

In a zoom lens having a fourth structure of the present invention, a distance H from an optical axis of the lens system, a distance $X_8(H)$ between the image side lens-face (aspherical surface) of the fourth lens 4 and a tangential plane in a position of the optical axis with respect to the distance H, and curvature $C_8$ of the image side lens face of the fourth lens 4 on the optical axis in the third structure satisfy the following condition, $$X_8(H) > C_8 \cdot H^2 / \{1 + \sqrt{(1 - C_8^2 \cdot H^2)}\}. \qquad (4\text{-}1)$$

In this case, $C_8$ shows an inverse number of a radius of curvature of the image side lens face of the fourth lens 4 on the optical axis of the lens system. Further, with respect to the above distance X(H) about the aspherical surface, a direction from the object side toward the image side is set to a positive direction with the tangential plane as a reference.

In a zoom lens having a fifth structure of the present invention, similar to the zoom lens having the second structure, a refractive index $n_2$ of a material of the second lens 2, an Abbe's number $\nu_4$ of a material of the fourth lens 4 and an Abbe's number $\nu_7$ of a material of the seventh lens 7 in the third or fourth structure satisfy the following conditions, $$n_2 > 1.70 \qquad (2\text{-}1)$$

$$\nu_4 > 65.0 \qquad (2\text{-}2)$$

$$\nu_7 > 65.0. \qquad (2\text{-}3)$$

In a zoom lens having a sixth structure of the present invention, each of image side lens faces of the fourth and fifth lenses 4 and 5 in the third structure is constructed by an aspherical surface. A focal length $f_T$ of the entire lens system at a long focal point end thereof, a focal length $f_1$ of the first lens group I and a focal length $f_2$ of the second lens group II satisfy the following conditions, $$0.25 < f_1/f_T < 0.28 \qquad (1\text{-}1)$$

$$f_2/f_1 > -0.95. \qquad (1\text{-}2)$$

These conditions are equal to the first two conditions of the three conditions satisfied with respect to the zoom lens having the first structure.

In a zoom lens having a seventh structure of the present invention, similar to the zoom lens having the fourth structure, the above distance $X_8(H)$ and the curvature $C_8$ with respect to the image side lens face of the fourth lens 4 as an aspherical surface in the sixth structure satisfy the following condition, $$X_8(H) > C_8 \cdot H^2 / \{1 + \sqrt{(1 - C_8^2 \cdot H^2)}\}. \qquad (4\text{-}1)$$

In a zoom lens having an eighth structure of the present invention, a distance $X_{10}(H)$ between the image side lens face of the fifth lens and a tangential plane in a position of the optical axis with respect to the distance H, and curvature $C_{10}$ of the image side lens face of the fifth lens on the optical axis in the sixth structure satisfy the following condition, $$X_{10}(H) < C_{10} \cdot H^2 / \{1 + \sqrt{(1 - C_{10}^2 \cdot H^2)}\}. \qquad (8\text{-}1)$$

In a zoom lens having a ninth structure of the present invention, a distance $X_{10}(H)$ between the image side lens face of the fifth lens and a tangential plane in a position of the optical axis with respect to the distance H, and curvature $C_{10}$ of the image side lens face of the fifth lens on the optical axis in the seventh structure satisfy the following condition, $$X_{10}(H) < C_{10} \cdot H^2 / \{1 + \sqrt{(1 - C_{10}^2 \cdot H^2)}\}. \qquad (8\text{-}1)$$

In a zoom lens having a tenth structure of the present invention, similar to the zoom lens having the second structure, a refractive index $n_2$ of a material of the second lens 2, an Abbe's number $\nu_4$ of a material of the fourth lens 4 and an Abbe's number $\nu_7$ of a material of the seventh lens 7 in the sixth structure satisfy the following conditions, $$n_2 > 1.70 \qquad (2\text{-}1)$$

$$\nu_4 > 65.0 \qquad (2\text{-}2)$$

$$\nu_7 > 65.0. \qquad (2\text{-}3)$$

In a zoom lens having an eleventh structure of the present invention, similar to the zoom lens having the second structure, a refractive index $n_2$ of a material of the second lens 2, an Abbe's number $\nu_4$ of a material of the fourth lens 4 and an Abbe's number $\nu_7$ of a material of the seventh lens 7 in the seventh structure satisfy the following conditions, $$n_2 > 1.70 \qquad (2\text{-}1)$$

$$\nu_4 > 65.0 \qquad (2\text{-}2)$$

$$\nu_7 > 65.0. \qquad (2\text{-}3)$$

In a zoom lens having a twelfth structure of the present invention, similar to the zoom lens having the second structure, a refractive index $n_2$ of a material of the second lens 2, an Abbe's number $\nu_4$ of a material of the fourth lens 4 and an Abbe's number $\nu_7$ of a material of the seventh lens 7 in the eighth or ninth structure satisfy the following conditions, $$n_2 > 1.70 \qquad (2\text{-}1)$$

$$\nu_4 > 65.0 \qquad (2\text{-}2)$$

$$\nu_7 > 65.0. \qquad (2\text{-}3)$$

In a zoom lens having a thirteenth structure of the present invention, each of the image side lens face of the fourth lens, and object and image side lens faces of the fifth lens in the sixth structure is constructed by an aspherical surface. A focal length $f_T$ of the entire lens system at a long focal point end thereof, a focal length $f_1$ of the first lens group I and a focal length $f_2$ of the second lens group II satisfy the following conditions, $$0.24 < f_1/f_T < 0.27 \qquad (13\text{-}1)$$

$$f_2/f_1 > -0.90. \qquad (13\text{-}2)$$

In a zoom lens having a fourteenth structure of the present invention, similar to the zoom lens having each of the fourth and seventh structures, the above distance $X_8(H)$ and the curvature $C_8$ with respect to the image side lens face of the fourth lens 4 as an aspherical surface in the thirteenth structure satisfy the following condition, $$X_8(H) > C_8 \cdot H^2 / \{1 + \sqrt{(1 - C_8^2 \cdot H^2)}\}. \quad (4\text{-}1)$$

In a zoom lens having a fifteenth structure of the present invention, a distance $X_9(H)$ between the object side lens face of the fifth lens and a tangential plane in a position of the optical axis with respect to the distance H, curvature $C_9$ of the object side lens face of the fifth lens on the optical axis, a distance $X_{10}(H)$ between the image side lens face of the fifth lens and the tangential plane in the position of the optical axis with respect to the distance H, and curvature $C_{10}$ of the image side lens face of the fifth lens on the optical axis in the thirteenth structure satisfy the following condition, $$X_{10}(H) - X_9(H) < C_{10} \cdot H^2 / \{1 + \sqrt{(1 - C_{10}^2 \cdot H^2)}\} - C_9 \cdot H^2 / \{1 + \sqrt{(1 - C_9^2 \cdot H^2)}\}. \quad (15\text{-}1)$$

In a zoom lens having a sixteenth structure of the present invention, a distance $X_9(H)$ between the object side lens face of the fifth lens and a tangential plane in a position of the optical axis with respect to the distance H, curvature $C_9$ of the object side lens face of the fifth lens on the optical axis, a distance $X_{10}(H)$ between the image side lens face of the fifth lens and the tangential plane in the position of the optical axis with respect to the distance H, and curvature $C_{10}$ of the image side lens face of the fifth lens on the optical axis in the fourteenth structure satisfy the following condition, $$X_{10}(H) - X_9(H) < C_{10} \cdot H^2 / \{1 + \sqrt{(1 - C_{10}^2 \cdot H^2)}\} - C_9 \cdot H^2 / \{1 + \sqrt{(1 - C_9^2 \cdot H^2)}\}. \quad (15\text{-}1)$$

In a zoom lens having a seventeenth structure of the present invention, similar to the zoom lens having each of the second, fifth and ninth structures, a refractive index $n_2$ of a material of the second lens, an Abbe's number $\nu_4$ of a material of the fourth lens and an Abbe's number $\nu_7$ of a material of the seventh lens in the thirteenth structure satisfy the following conditions, $$n_2 > 1.70 \quad (2\text{-}1)$$

$$\nu_4 > 65.0 \quad (2\text{-}2)$$

$$\nu_7 > 65.0. \quad (2\text{-}3)$$

In a zoom lens having an eighteenth structure of the present invention, similar to the zoom lens having each of the second, fifth and ninth structures, a refractive index $n_2$ of a material of the second lens, an Abbe's number $\nu_4$ of a material of the fourth lens and an Abbe's number $\nu_7$ of a material of the seventh lens in the fourteenth structure satisfy the following conditions, $$n_2 > 1.70 \quad (2\text{-}1)$$

$$\nu_4 > 65.0 \quad (2\text{-}2)$$

$$\nu_7 > 65.0. \quad (2\text{-}3)$$

In a zoom lens having a nineteenth structure of the present invention, similar to the zoom lens having each of the second, fifth and ninth structures, a refractive index $n_2$ of a material of the second lens, an Abbe's number $\nu_4$ of a material of the fourth lens and an Abbe's number $\nu_7$ of a material of the seventh lens in the fifteenth or sixteenth structure satisfy the following conditions, $$n_2 > 1.70 \quad (2\text{-}1)$$

$$\nu_4 > 65.0 \quad (2\text{-}2)$$

$$\nu_7 > 65.0. \quad (2\text{-}3)$$

In a zoom lens having a twentieth structure of the present invention, the third lens 3 constituting a positive lens of the first lens group in the lens arrangement shown in FIG. 1 is set to a biconvex lens and is joined to the second lens 2 as a biconcave lens. A focal length $f_W$ of the entire lens system at a short focal point end thereof, a focal length $f_T$ of the entire lens system at a long focal point end thereof, a focal length $f_1$ of the first lens group I, a focal length $f_2$ of the second lens group II, a thickness $d_3$ of the second lens 2 on the optical axis of the lens system, and a thickness $d_4$ of the third lens on the optical axis of the lens system satisfy the following conditions, $$0.24 < f_1/f_T < 0.28 \quad (20\text{-}1)$$

$$f_2/f_1 > -0.95 \quad (1\text{-}2)$$

$$(d_3 + d_4)/f_W > 0.26 \quad (20\text{-}3)$$

The above condition (1-2) is equal to the second condition of the three conditions satisfied with respect to the zoom lens having the first structure.

In a zoom lens having a twenty-first structure of the present invention, similar to the zoom lens having the second structure, a refractive index $n_2$ of a material of the second lens and an Abbe's number $\nu_4$ of a material of the fourth lens in the twentieth structure satisfy the following conditions, $$n_2 > 1.70 \quad (2\text{-}1)$$

$$\nu_4 > 65.0 \quad (2\text{-}2)$$

In a zoom lens having a twenty-second structure of the present invention, similar to the zoom lens having the second structure, an Abbe's number $\nu_7$ of a material of the seventh lens in the twentieth or twenty-first structure satisfies the following condition, $$\nu_7 > 65.0. \quad (2\text{-}3)$$

Concrete Embodiments 1 to 15 of the present invention will next be described.

In each of the Embodiments, as shown in FIG. 1, the radius of curvature of an i-th lens face counted from an object side is set to $r_i$ (suffix $i = 1$ to 14). A distance between the i-th lens face and an (i+1)-th lens face on the optical axis of a lens system is set to $d_i$ ($i = 1$ to 13). $n_j$ (suffix $j = 1$ to 7) designates a refractive index of the material of a j-th lens counted from the object side. $\nu_j$ (suffix $j = 1$ to 7) designates an Abbe's number of this material of the j-th lens. Reference numeral f designates a combined focal length of the entire lens system. F/No designates an F-number and reference numeral ω designates a half field angle.

In the following description, reference numerals C, H and X(H) respectively designate curvature of an aspherical lens surface on the optical axis, a height of the aspherical lens surface from the optical axis, and a distance of the aspherical lens surface from a tangential plane on the optical axis. Reference numeral K designates a conical constant. Further, reference numerals P, Q, R and S respectively designate aspherical coefficients of fourth, sixth, eighth and tenth orders. In this case, the aspherical lens surface is provided as a curved surface represented by the following formula, $$X(H) = [C \cdot H^2 / \{1 + \sqrt{(1 - \{1 + K\}C^2 \cdot H^2)} \}] + P \cdot H^4 + Q \cdot H^6 + R \cdot H^8 + S \cdot H^{10}.$$

In this case, a shape of the aspherical lens surface is specified by providing the conical constant K and the aspherical coefficients P, Q, R and S of higher orders. In the following tables, [E-number] in the aspherical coefficients of higher orders designates power. For example, [E-10] means $1/10^{10}$ and this number $1/10^{10}$ is multiplied by a number located before this number $1/10^{10}$.

Embodiment 1
f = 38.7~103.1, F/No = 4.5~9.0,
ω = 28.8°~11.9°, $f_1/f_T$ = 0.271, $f_2/f_1$ = −0.892,
($d_3 + d_5$)/$f_W$ = 0.360

| i | $r_i$ | $d_i$ | j | $n_j$ | $\nu_j$ |
|---|---|---|---|---|---|
| 1 | 19.872 | 2.53 | 1 | 1.51602 | 56.80 |
| 2 | 70.448 | 1.39 | | | |
| 3 | −23.895 | 8.75 | 2 | 1.81600 | 46.62 |
| 4 | 13.302 | 0.10 | | | |
| 5 | 13.731 | 5.20 | 3 | 1.63854 | 55.38 |
| 6 | −29.312 | 0.10 | | | |
| 7 | 27.115 | 3.60 | 4 | 1.45600 | 90.31 |
| 8 | −22.673 | variable | | | |
| 9 | −42.373 | 2.82 | 5 | 1.58921 | 41.08 |
| 10 | −17.028 | 2.38 | | | |
| 11 | −17.518 | 1.50 | 6 | 1.75500 | 52.33 |
| 12 | −148.066 | 3.98 | | | |
| 13 | −13.065 | 1.50 | 7 | 1.45600 | 90.31 |
| 14 | −42.368 | | | | |

| Variable amounts | | | |
|---|---|---|---|
| f | 38.7 | 63.0 | 103.1 |
| $d_8$ | 15.01 | 8.08 | 3.80 |

FIG. 1 shows the arrangement of a zoom lens in accordance with the Embodiment 1. FIGS. 14a, 14b and 14c are diagrams respectively showing spherical aberration, astigmatism and distortional aberration at a short focal point end of the zoom lens in the Embodiment 1. FIGS. 15a, 15b and 15c are diagrams respectively showing spherical aberration, astigmatism and distortional aberration at an intermediate focal length of the zoom lens in the Embodiment 1. FIGS. 16a, 16b and 16c are diagrams respectively showing spherical aberration, astigmatism and distortional aberration at a long focal point end of the zoom lens in the Embodiment 1. In the aberration diagrams with respect to the following Embodiments, a broken line in each of the spherical aberration diagrams shows a sine condition. A solid line in each of the astigmatic diagrams shows a sagittal ray. A broken line in each of the astigmatic diagrams shows a meridional ray.

Embodiment 2
f = 38.7~102.8, F/No = 4.6~9.2,
ω = 28.9°~11.9°, $f_1/f_T$ = 0.261, $f_2/f_1$ = −0.891,
($d_3 + d_5$)/$f_W$ = 0.363

| i | $r_i$ | $d_i$ | j | $n_j$ | $\nu_j$ |
|---|---|---|---|---|---|
| 1 | 19.491 | 2.64 | 1 | 1.55089 | 44.45 |
| 2 | 95.384 | 1.22 | | | |
| 3 | −25.306 | 5.76 | 2 | 1.86733 | 41.78 |
| 4 | 12.958 | 0.10 | | | |
| 5 | 13.477 | 8.28 | 3 | 1.64035 | 54.81 |
| 6 | −29.786 | 0.10 | | | |
| 7 | 31.309 | 3.34 | 4 | 1.48749 | 70.21 |
| 8 | −21.862 | variable | | | |
| 9 | −43.703 | 2.71 | 5 | 1.57798 | 42.99 |
| 10 | −16.810 | 2.60 | | | |
| 11 | −16.149 | 1.50 | 6 | 1.75500 | 52.30 |
| 12 | −170.793 | 3.49 | | | |
| 13 | −13.365 | 1.50 | 7 | 1.48749 | 70.21 |
| 14 | −35.351 | | | | |

| Variable amounts | | | |
|---|---|---|---|
| f | 38.7 | 63.0 | 103.1 |
| $d_8$ | 14.11 | 7.74 | 3.80 |

Figure 2:
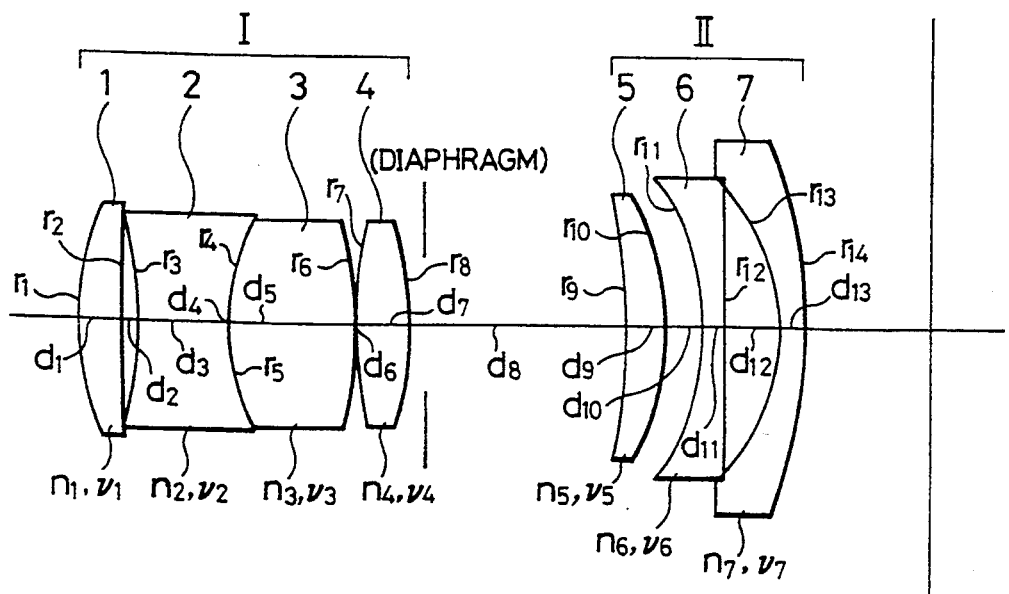
FIG. 2 is a view showing the construction of a zoom lens in accordance with Embodiment 2 of the present invention.

FIG. 2 shows the arrangement of a zoom lens in accordance with the Embodiment 2. FIGS. 17a, 17b and 17c are diagrams respectively showing spherical aberration, astigmatism and distortional aberration at a short focal point end of the zoom lens in the Embodiment 2. FIGS. 18a, 18b and 18c are diagrams respectively showing spherical aberration, astigmatism and distortional aberration at an intermediate focal length of the zoom lens in the Embodiment 2. FIGS. 19a, 19b and 19c are diagrams respectively showing spherical aberration, astigmatism and distortional aberration at a long focal point end of the zoom lens in the Embodiment 2.

Embodiment 3
f = 38.7~103.1, F/No = 4.6~9.2,
ω = 28.9°~11.9°, $f_1/f_T$ = 0.265, $f_2/f_1$ = −0.887,
($d_3 + d_5$)/$f_W$ = 0.374

| i | $r_i$ | $d_i$ | j | $n_j$ | $\nu_j$ |
|---|---|---|---|---|---|
| 1 | 19.359 | 2.70 | 1 | 1.53172 | 48.84 |
| 2 | 106.176 | 1.18 | | | |
| 3 | −26.345 | 5.98 | 2 | 1.84750 | 43.03 |
| 4 | 12.677 | 0.10 | | | |
| 5 | 13.139 | 8.52 | 3 | 1.62230 | 53.11 |
| 6 | −31.745 | 0.10 | | | |
| 7 | 32.337 | 3.28 | 4 | 1.49700 | 81.61 |
| 8 | −22.162 | variable | | | |
| 9 | −45.945 | 2.74 | 5 | 1.60801 | 46.21 |
| 10 | −17.311 | 2.37 | | | |
| 11 | −17.270 | 1.50 | 6 | 1.74100 | 52.60 |
| 12 | −184.133 | 3.66 | | | |
| 13 | −13.109 | 1.50 | 7 | 1.49700 | 81.61 |
| 14 | −41.497 | | | | |

| Variable amounts | | | |
|---|---|---|---|
| f | 38.7 | 63.0 | 103.1 |
| $d_8$ | 14.48 | 7.88 | 3.80 |

Figure 3:
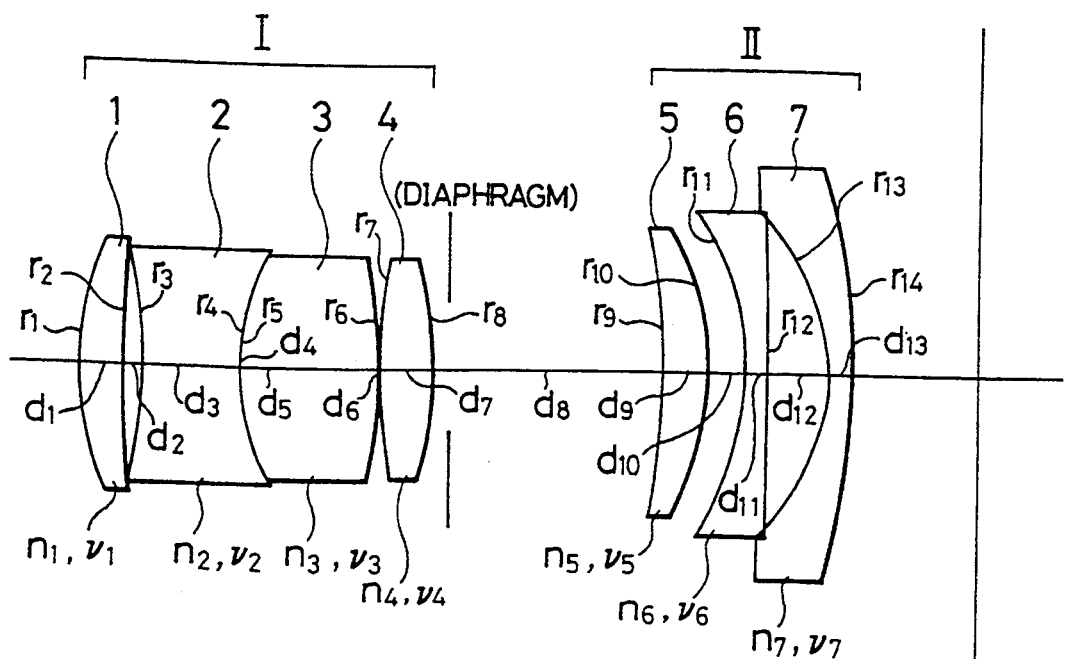
FIG. 3 is a view showing the construction of a zoom lens in accordance with Embodiment 3 of the present invention.

FIG. 3 shows the arrangement of a zoom lens in accordance with the Embodiment 3. FIGS. 20a, 20b and 20c are diagrams respectively showing spherical aberration, astigmatism and distortional aberration at a short focal point end of the zoom lens in the Embodiment 3. FIGS. 21a, 21b and 21c are diagrams respectively showing spherical aberration, astigmatism and distortional aberration at an intermediate focal length of the zoom lens in the Embodiment 3. FIGS. 22a, 22b and 22c are diagrams respectively showing spherical aberration, astigmatism and distortional aberration at a long focal point end of the zoom lens in the Embodiment 3.

The above Embodiments 1 to 3 relate to a zoom lens having each of first and second lens structures of the present invention.

Embodiment 4
f = 38.7~102.9, F/No = 4.6~9.2,
ω = 28.8°~11.9°, $f_1/f_T$ = 0.276, $f_2/f_1$ = −0.922

| i | $r_i$ | $d_i$ | j | $n_j$ | $v_j$ |
|---|---|---|---|---|---|
| 1 | 20.437 | 2.64 | 1 | 1.53614 | 48.16 |
| 2 | 216.271 | 1.13 | | | |
| 3 | −22.663 | 1.50 | 2 | 1.87128 | 41.52 |
| 4 | 67.208 | 2.66 | | | |
| 5 | −127.516 | 5.00 | 3 | 1.49045 | 67.82 |
| 6 | −26.004 | 0.10 | | | |
| 7 | 27.374 | 3.44 | 4 | 1.45600 | 90.31 |
| 8 | −20.230 | variable | | | |
| 9 | −60.741 | 3.17 | 5 | 1.53957 | 47.23 |
| 10 | −17.015 | 2.23 | | | |
| 11 | −17.037 | 1.50 | 6 | 1.75500 | 52.30 |
| 12 | −199.524 | 3.87 | | | |
| 13 | −14.250 | 1.50 | 7 | 1.45600 | 90.31 |
| 14 | −45.566 | | | | |

Aspherical surface (eighth lens face)
K = −1.674107, P = 8.47055E-6,
Q = 4.80354E-8, R = −7.79053E-10,
S = 2.88322E-11

Variable amounts

| f | 38.7 | 62.9 | 102.9 |
|---|---|---|---|
| $d_8$ | 15.83 | 8.40 | 3.80 |

Figure 4:
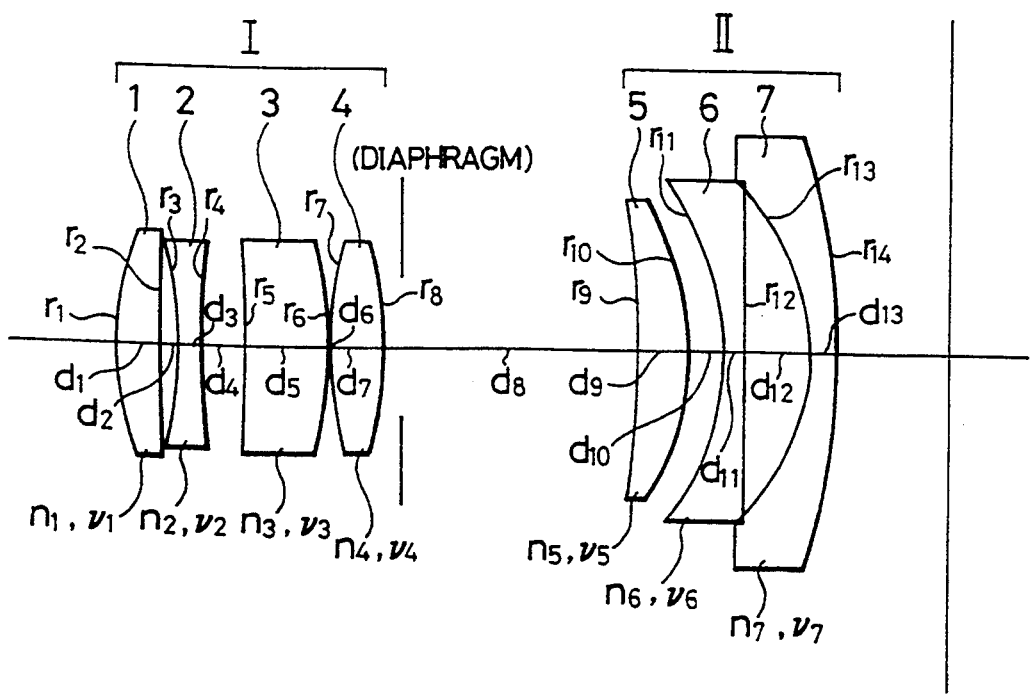
FIG. 4 is a view showing the construction of a zoom lens in accordance with Embodiment 4 of the present invention.

FIG. 4 shows the arrangement of a zoom lens in accordance with the Embodiment 4. FIGS. 23a, 23b and 23c are diagrams respectively showing spherical aberration, astigmatism and distortional aberration at a short focal point end of the zoom lens in the Embodiment 4. FIGS. 24a, 24b and 24c are diagrams respectively showing spherical aberration, astigmatism and distortional aberration at an intermediate focal length of the zoom lens in the Embodiment 4. FIGS. 25a, 25b and 25c are diagrams respectively showing spherical aberration, astigmatism and distortional aberration at a long focal point end of the zoom lens in the Embodiment 4.

Embodiment 5
f = 38.7~103.2, F/No = 4.6~9.3,
ω = 28.8°~11.9°, $f_1/f_T$ = 0.271, $f_2/f_1$ = −0.970

| i | $r_i$ | $d_i$ | j | $n_j$ | $v_j$ |
|---|---|---|---|---|---|
| 1 | 19.435 | 2.29 | 1 | 1.56185 | 42.16 |
| 2 | 47.865 | 1.66 | | | |
| 3 | −18.087 | 1.50 | 2 | 1.88300 | 40.80 |
| 4 | 72.955 | 1.27 | | | |
| 5 | 105.987 | 5.00 | 3 | 1.49336 | 77.10 |
| 6 | −20.603 | 0.10 | | | |
| 7 | 31.127 | 3.40 | 4 | 1.48749 | 70.44 |
| 8 | −20.446 | variable | | | |
| 9 | −49.361 | 3.08 | 5 | 1.54607 | 45.58 |
| 10 | −16.593 | 2.41 | | | |
| 11 | −15.940 | 1.50 | 6 | 1.75500 | 52.30 |
| 12 | −128.425 | 3.39 | | | |
| 13 | −15.217 | 1.50 | 7 | 1.48749 | 70.44 |
| 14 | −38.014 | | | | |

Aspherical surface (eighth lens face)
K = −1.661857, P = 8.04694E-6,
Q = 7.08563E-10, R = 5.43693E-10,
S = 1.44455E-11

Variable amounts

| f | 38.7 | 63.1 | 103.2 |
|---|---|---|---|
| $d_8$ | 16.01 | 8.47 | 3.80 |

Figure 5:
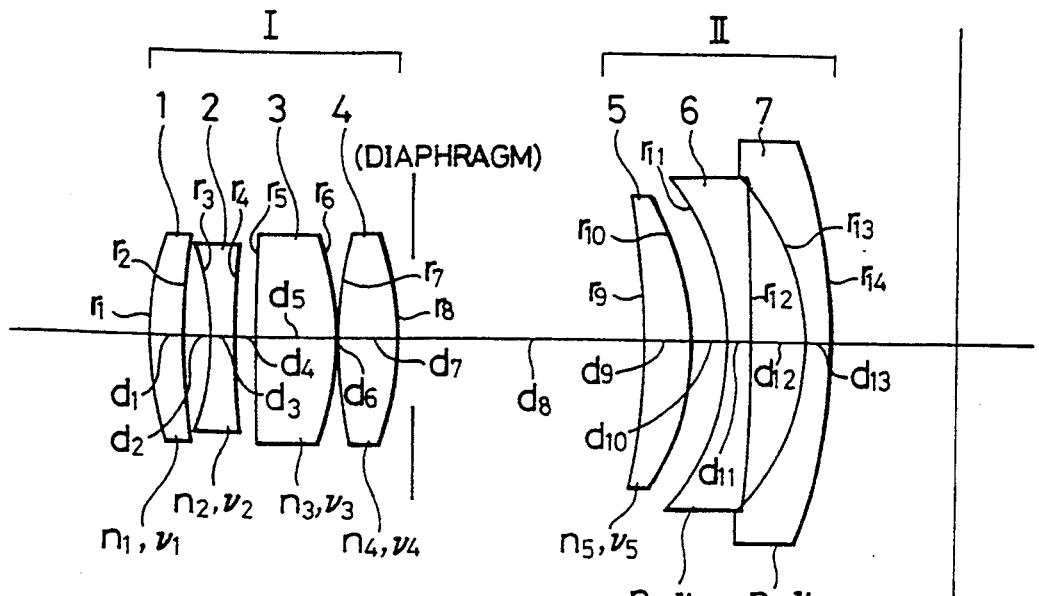
FIG. 5 is a view showing the construction of a zoom lens in accordance with Embodiment 5 of the present invention.

FIG. 5 shows the arrangement of a zoom lens in accordance with the Embodiment 5. FIGS. 26a, 26b and 26c are diagrams respectively showing spherical aberration, astigmatism and distortional aberration at a short focal point end of the zoom lens in the Embodiment 5. FIGS. 27a, 27b and 27c are diagrams respectively showing spherical aberration, astigmatism and distortional aberration at an intermediate focal length of the zoom lens in the Embodiment 5. FIGS. 28a, 28b and 28c are diagrams respectively showing spherical aberration, astigmatism and distortional aberration at a long focal point end of the zoom lens in the Embodiment 5.

Embodiment 6
f = 38.7~102.9, F/No = 4.6~9.2,
ω = 28.9°~11.9°, $f_1/f_T$ = 0.274, $f_2/f_1$ = −0.960

| i | $r_i$ | $d_i$ | j | $n_j$ | $v_j$ |
|---|---|---|---|---|---|
| 1 | 19.400 | 2.35 | 1 | 1.54814 | 45.82 |
| 2 | 53.998 | 1.56 | | | |
| 3 | −18.963 | 1.50 | 2 | 1.88300 | 40.80 |
| 4 | 79.207 | 1.53 | | | |
| 5 | 181.883 | 5.00 | 3 | 1.49831 | 65.13 |
| 6 | −22.408 | 0.10 | | | |
| 7 | 32.455 | 3.34 | 4 | 1.49700 | 81.61 |
| 8 | −20.641 | variable | | | |
| 9 | −53.097 | 3.11 | 5 | 1.54072 | 47.20 |
| 10 | −16.913 | 2.37 | | | |
| 11 | −16.665 | 1.50 | 6 | 1.75500 | 52.32 |
| 12 | −143.137 | 3.58 | | | |
| 13 | −14.872 | 1.50 | 7 | 1.49700 | 81.61 |
| 14 | −38.475 | | | | |

Aspherical surface (eighth lens face)
K = −1.621300, P = 7.61001E-6,
Q = 1.01674E-8, R = 2.70770E-10,
S = 1.52676E-11

Variable amounts

| f | 38.7 | 63.0 | 102.9 |
|---|---|---|---|
| $d_8$ | 16.12 | 8.51 | 3.80 |

Figure 6:
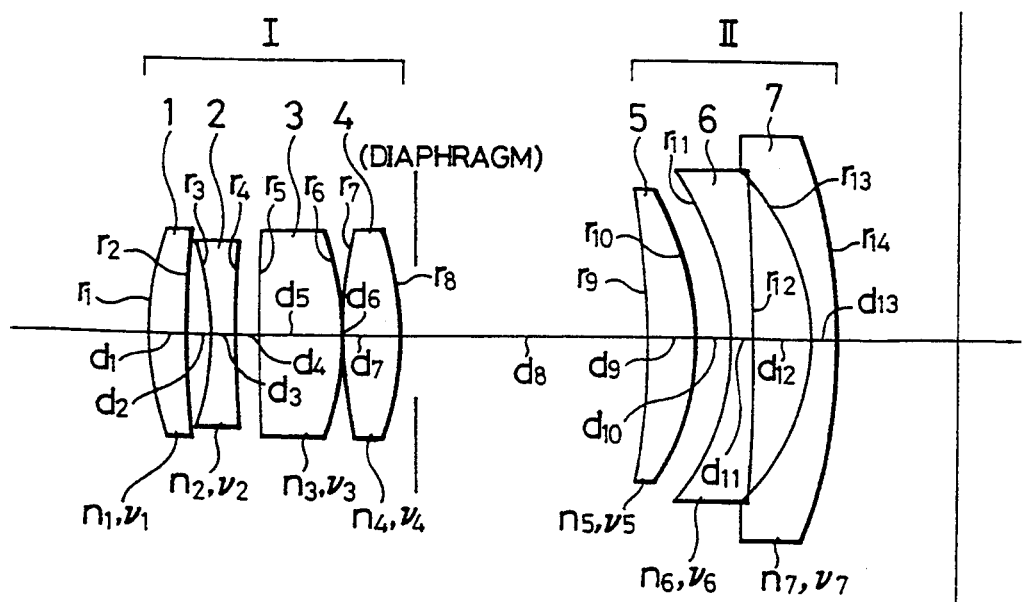
FIG. 6 is a view showing the construction of a zoom lens in accordance with Embodiment 6 of the present invention.

FIG. 6 shows the arrangement of a zoom lens in accordance with the Embodiment 6. FIGS. 29a, 29b and 29c are diagrams respectively showing spherical aberration, astigmatism and distortional aberration at a short focal point end of the zoom lens in the Embodiment 6. FIGS. 30a, 30b and 30c are diagrams respectively showing spherical aberration, astigmatism and distortional aberration at an intermediate focal length of the zoom lens in the Embodiment 6. FIGS. 31a, 31b and 31c are diagrams respectively showing spherical aberration, astigmatism and distortional aberration at a long focal point end of the zoom lens in the Embodiment 6.

The above Embodiments 4 to 6 relate to a zoom lens having each of third, fourth and fifth lens structures of the present invention.

Embodiment 7
f = 38.7~103.0, F/No = 4.6~9.2,
ω = 28.9°~11.9°, $f_1/f_T$ = 0.268, $f_2/f_1$ = −0.908

| i | $r_i$ | $d_i$ | j | $n_j$ | $v_j$ |
|---|---|---|---|---|---|
| 1 | 20.000 | 2.37 | 1 | 1.54814 | 45.82 |
| 2 | 59.494 | 1.56 | | | |
| 3 | −18.984 | 2.31 | 2 | 1.88300 | 40.80 |
| 4 | 78.442 | 1.98 | | | |
| 5 | 80.501 | 2.89 | 3 | 1.49831 | 65.13 |
| 6 | −24.731 | 1.05 | | | |
| 7 | 34.596 | 3.34 | 4 | 1.49700 | 81.61 |
| 8 | −19.303 | variable | | | |
| 9 | −61.429 | 2.99 | 5 | 1.54072 | 47.20 |
| 10 | −17.536 | 2.26 | | | |
| 11 | −17.571 | 1.50 | 6 | 1.75500 | 52.32 |
| 12 | −223.793 | 3.88 | | | |
| 13 | −13.226 | 1.50 | 7 | 1.49700 | 81.61 |
| 14 | −36.391 | | | | |

Aspherical surface (eighth lens face)
K = −1.738187, P = 9.32458E-6,
Q = 1.95618E-8, R = −2.51103E-10, -continued

| | | |
|---|---|---|
| S = 2.16283E-11 | | |
| Aspherical surface (tenth lens face) | | |
| K = 0.154863, P = −6.17083E-6, | | |
| Q = 1.72522E-7, R = −2.64494E-9, | | |
| S = 1.08389E-11 | | |
| Variable amounts | | |
| f    38.7 | 63.0 | 103.0 |
| d₈    15.00 | 8.08 | 3.80 |

Figure 7:
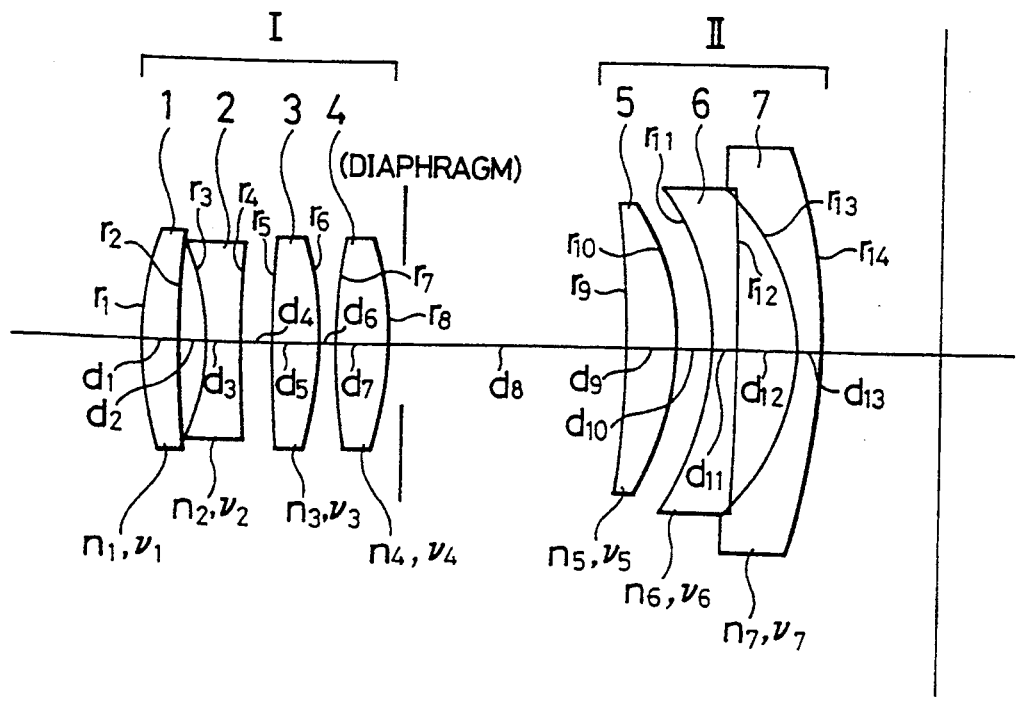
FIG. 7 is a view showing the construction of a zoom lens in accordance with Embodiment 7 of the present invention.

FIG. 7 shows the arrangement of a zoom lens in accordance with the Embodiment 7. FIGS. 32a, 32b and 32c are diagrams respectively showing spherical aberration, astigmatism and distortional aberration at a short focal point end of the zoom lens in the Embodiment 7. FIGS. 33a, 33b and 33c are diagrams respectively showing spherical aberration, astigmatism and distortional aberration at an intermediate focal length of the zoom lens in the Embodiment 7. FIGS. 34a, 34b and 34c are diagrams respectively showing spherical aberration, astigmatism and distortional aberration at a long focal point end of the zoom lens in the Embodiment 7.

Embodiment 8
f = 38.7~103.0, F/No = 4.6~9.3,
ω = 28.9°~11.9°, f₁/f_T = 0.263, f₂/f₁ = −0.906

| i | r_i | d_i | j | n_j | ν_j |
|---|---|---|---|---|---|
| 1 | 19.130 | 2.42 | 1 | 1.53524 | 48.41 |
| 2 | 60.209 | 1.60 | | | |
| 3 | −17.910 | 3.24 | 2 | 1.88300 | 40.80 |
| 4 | 68.412 | 1.53 | | | |
| 5 | 56.321 | 3.38 | 3 | 1.48700 | 70.20 |
| 6 | −20.371 | 0.10 | | | |
| 7 | 36.311 | 3.24 | 4 | 1.48749 | 70.44 |
| 8 | −20.374 | variable | | | |
| 9 | −63.725 | 2.99 | 5 | 1.55376 | 43.82 |
| 10 | −17.324 | 2.28 | | | |
| 11 | −15.797 | 1.50 | 6 | 1.75500 | 52.32 |
| 12 | −239.522 | 3.82 | | | |
| 13 | −13.150 | 1.50 | 7 | 1.48749 | 70.44 |
| 14 | −30.996 | | | | |

Aspherical surface (eighth lens face)
K = −1.806941, P = 1.01904E-5,
Q = 8.11086E-9, R = 4.56499E-10,
S = 1.90477E-11
Aspherical surface (tenth lens face)
K = 0.271475, P = −1.00207E-5,
Q = 2.81384E-7, R = −6.01397E-9,
S = 3.81967E-11
Variable amounts

| f | 38.7 | 62.9 | 103.0 |
|---|---|---|---|
| d₈ | 14.56 | 7.92 | 3.80 |

Figure 8:
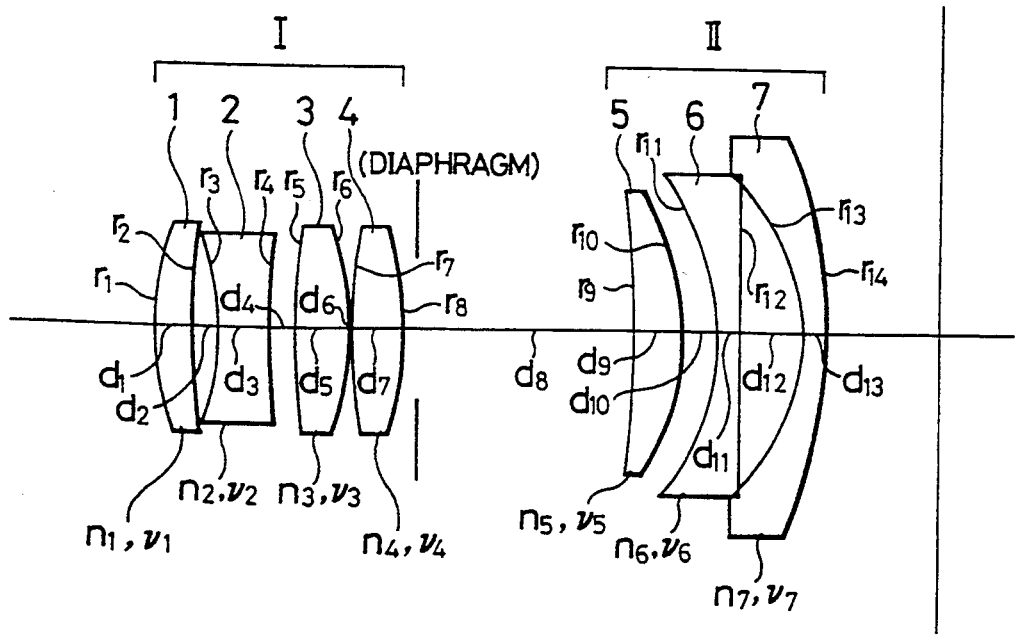
FIG. 8 is a view showing the construction of a zoom lens in accordance with Embodiment 8 of the present invention.

FIG. 8 shows the arrangement of a zoom lens in accordance with the Embodiment 8. FIGS. 35a, 35b and 35c are diagrams respectively showing spherical aberration, astigmatism and distortional aberration at a short focal point end of the zoom lens in the Embodiment 8. FIGS. 36a, 36b and 36c are diagrams respectively showing spherical aberration, astigmatism and distortional aberration at an intermediate focal length of the zoom lens in the Embodiment 8. FIGS. 37a, 37b and 37c are diagrams respectively showing spherical aberration, astigmatism and distortional aberration at a long focal point end of the zoom lens in the Embodiment 8.

Embodiment 9
f = 38.7~102.9, F/No = 4.6~9.2,
ω = 28.9°~11.9°, f₁/f_T = 0.266, f₂/f₁ = −0.912

| i | r_i | d_i | j | n_j | ν_j |
|---|---|---|---|---|---|

-continued

| | | | | | |
|---|---|---|---|---|---|
| 1 | 20.424 | 2.43 | 1 | 1.54814 | 45.82 |
| 2 | 81.604 | 1.46 | | | |
| 3 | −18.830 | 1.50 | 2 | 1.88300 | 40.80 |
| 4 | 60.555 | 1.69 | | | |
| 5 | 44.345 | 4.95 | 3 | 1.49831 | 65.13 |
| 6 | −23.875 | 0.32 | | | |
| 7 | 43.193 | 3.15 | 4 | 1.49700 | 81.61 |
| 8 | −19.959 | variable | | | |
| 9 | −74.313 | 3.07 | 5 | 1.54072 | 47.20 |
| 10 | −17.417 | 2.10 | | | |
| 11 | −16.769 | 1.50 | 6 | 1.75500 | 52.32 |
| 12 | −424.651 | 4.04 | | | |
| 13 | −12.849 | 1.50 | 7 | 1.49700 | 81.61 |
| 14 | −31.168 | | | | |

Aspherical surface (eighth lens face)
K = −1.763827, P = 9.74224E-6,
Q = 2.78555E-8, R = 3.93125E-10,
S = 1.52109E-11
Aspherical surface (tenth lens face)
K = 0.226492, P = −7.96697E-6,
Q = 1.71023E-7, R = −4.04190E-9,
S = 2.47754E-11
Variable amounts

| f | 38.7 | 62.9 | 102.9 |
|---|---|---|---|
| d₈ | 14.73 | 7.98 | 3.80 |

Figure 9:
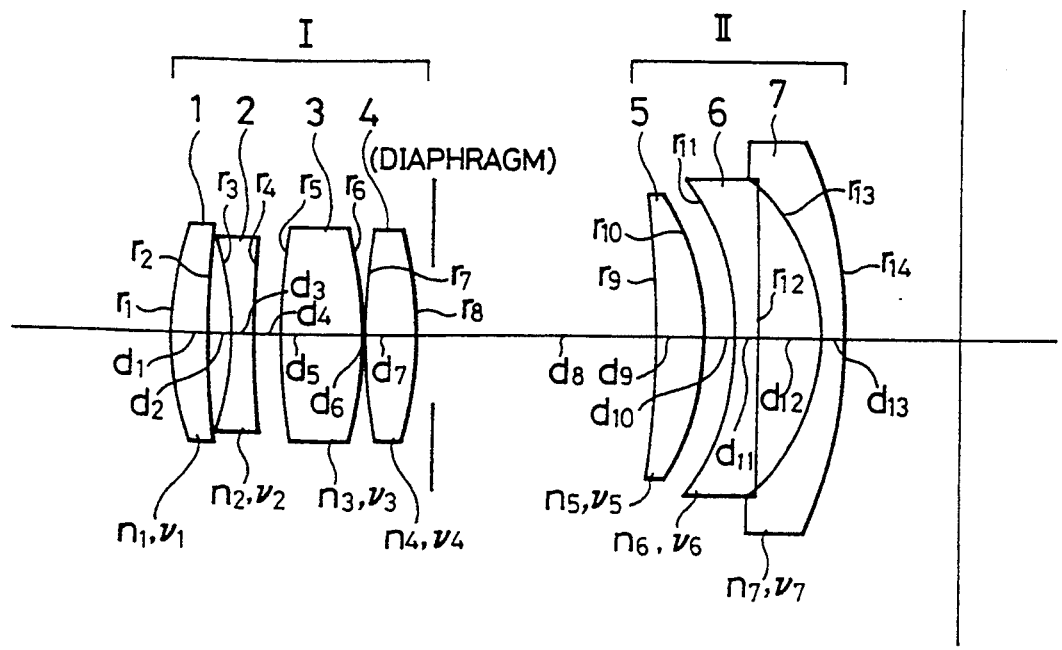
FIG. 9 is a view showing the construction of a zoom lens in accordance with Embodiment 9 of the present invention.

FIG. 9 shows the arrangement of a zoom lens in accordance with the Embodiment 9. FIGS. 38a, 38b and 38c are diagrams respectively showing spherical aberration, astigmatism and distortional aberration at a short focal point end of the zoom lens in the Embodiment 9. FIGS. 39a, 39b and 39c are diagrams respectively showing spherical aberration, astigmatism and distortional aberration at an intermediate focal length of the zoom lens in the Embodiment 9. FIGS. 40a, 40b and 40c are diagrams respectively showing spherical aberration, astigmatism and distortional aberration at a long focal point end of the zoom lens in the Embodiment 9.

The above Embodiments 7 to 9 relate to a zoom lens having each of sixth to twelfth lens structures of the present invention.

Embodiment 10
f = 38.7~102.8, F/No = 4.6~9.2,
ω = 29.0°~11.9°, f₁/f_T = 0.260, f₂/f₁ = −0.854

| i | r_i | d_i | j | n_j | ν_j |
|---|---|---|---|---|---|
| 1 | 20.151 | 2.44 | 1 | 1.54814 | 45.82 |
| 2 | 78.281 | 1.50 | | | |
| 3 | −18.453 | 1.50 | 2 | 1.88300 | 40.80 |
| 4 | 70.953 | 1.40 | | | |
| 5 | 35.984 | 3.12 | 3 | 1.49831 | 65.13 |
| 6 | −25.897 | 1.42 | | | |
| 7 | 47.279 | 3.09 | 4 | 1.49700 | 81.61 |
| 8 | −18.029 | variable | | | |
| 9 | −64.626 | 3.38 | 5 | 1.54072 | 47.20 |
| 10 | −16.167 | 1.65 | | | |
| 11 | −13.200 | 1.50 | 6 | 1.75500 | 52.32 |
| 12 | −39.102 | 3.06 | | | |
| 13 | −12.130 | 1.50 | 7 | 1.49700 | 81.61 |
| 14 | −57.668 | | | | |

Aspherical surface (eighth lens face)
K = −1.965458, P = 1.31248E-5,
Q = 1.86980E-8, R = −1.66458E-9,
S = 6.14529E-11
Aspherical surface (ninth lens face)
K = −120.45816, P = 2.01674E-5,
Q = 2.22357E-7, R = 8.78361E-9,
S = −6.15904E-11
Aspherical surface (tenth lens face)
K = −0.239028, P = 8.17941E-6,
Q = 1.57832E-7, R = −6.02458E-9,
S = 7.25106E-11
Variable amounts -continued

| f | 38.7 | 62.9 | 102.8 |
|---|---|---|---|
| $d_8$ | 13.64 | 7.56 | 3.80 |

Figure 10:
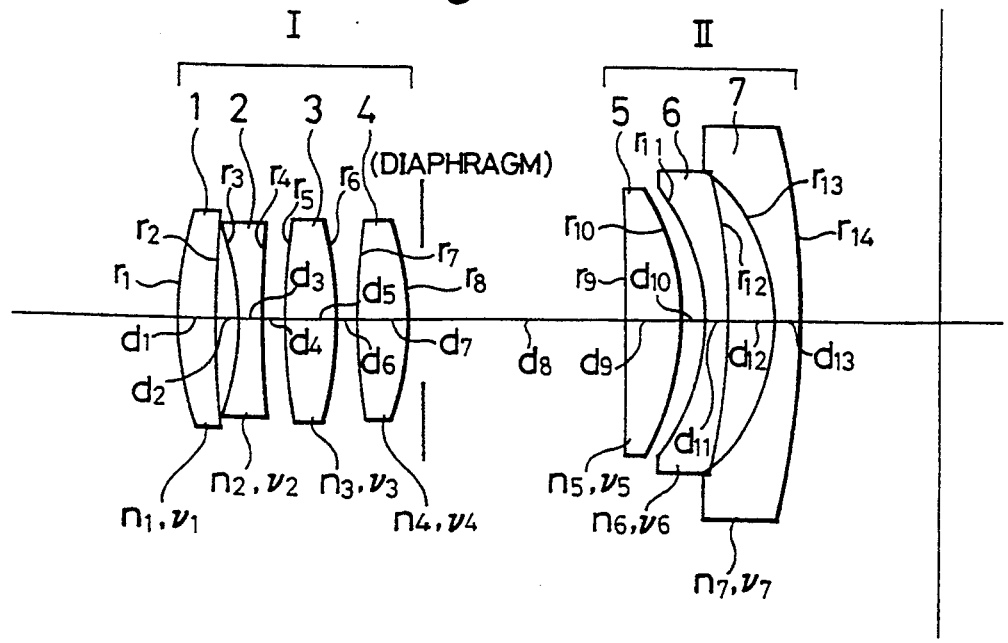
FIG. 10 is a view showing the construction of a zoom lens in accordance with Embodiment 10 of the present invention.

FIG. 10 shows the arrangement of a zoom lens in accordance with the Embodiment 10. FIGS. 41a, 41b and 41c are diagrams respectively showing spherical aberration, astigmatism and distortional aberration at a short focal point end of the zoom lens in the Embodiment 10. FIGS. 42a, 42b and 42c are diagrams respectively showing spherical aberration, astigmatism and distortional aberration at an intermediate focal length of the zoom lens in the Embodiment 10. FIGS. 43a, 43b and 43c are diagrams respectively showing spherical aberration, astigmatism and distortional aberration at a long focal point end of the zoom lens in the Embodiment 10.

Embodiment 11
f = 39.0~101.7, F/No = 4.6~9.2,
ω = 28.7°~12.0°, $f_1/f_T$ = 0.253, $f_2/f_1$ = −0.835

| i | $r_i$ | $d_i$ | j | $n_j$ | $v_j$ |
|---|---|---|---|---|---|
| 1 | 20.188 | 2.24 | 1 | 1.52310 | 50.95 |
| 2 | 97.366 | 1.20 | | | |
| 3 | −17.041 | 2.17 | 2 | 1.88300 | 40.80 |
| 4 | 44.952 | 0.10 | | | |
| 5 | 30.832 | 3.75 | 3 | 1.52630 | 51.05 |
| 6 | −23.870 | 1.25 | | | |
| 7 | 35.188 | 3.30 | 4 | 1.49700 | 81.61 |
| 8 | −16.612 | variable | | | |
| 9 | −95.812 | 5.04 | 5 | 1.53172 | 48.84 |
| 10 | −15.856 | 1.31 | | | |
| 11 | −10.791 | 1.50 | 6 | 1.69680 | 55.46 |
| 12 | −30.956 | 2.58 | | | |
| 13 | −12.502 | 1.50 | 7 | 1.49700 | 81.61 |
| 14 | −80.210 | | | | |

Aspherical surface (eighth lens face)
K = −1.822497, P = 1.02437E-5,
Q = −4.52117E-9, R = 7.21944E-10,
S = 1.28617E-11
Aspherical surface (ninth lens face)
K = −328.19672, P = 5.22697E-5,
Q = 5.86355E-7, R = 3.38180E-9,
S = 4.38237E-11
Aspherical surface (tenth lens face)
K = 0.002008, P = −1.06276E-6,
Q = 1.07564E-7, R = −1.07332E-8,
S = 1.33536E-10
Variable amounts

| f | 39.0 | 63.0 | 101.7 |
|---|---|---|---|
| $d_8$ | 12.52 | 7.13 | 3.80 |

Figure 11:
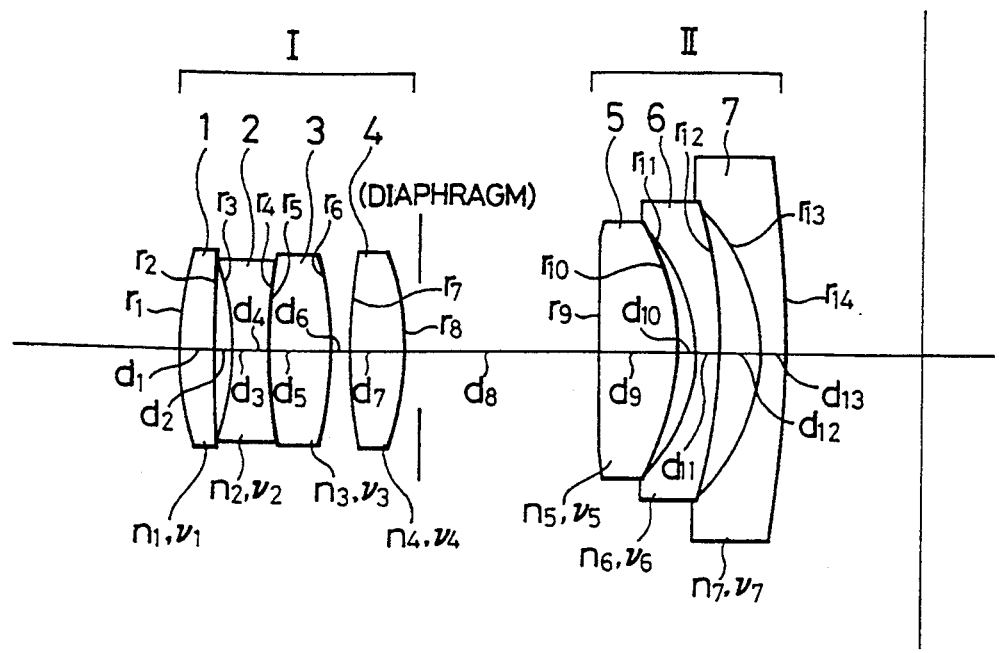
FIG. 11 is a view showing the construction of a zoom lens in accordance with Embodiment 11 of the present invention.

FIG. 11 shows the arrangement of a zoom lens in accordance with the Embodiment 11. FIGS. 44a, 44b and 44c are diagrams respectively showing spherical aberration, astigmatism and distortional aberration at a short focal point end of the zoom lens in the Embodiment 11. FIGS. 45a, 45b and 45c are diagrams respectively showing spherical aberration, astigmatism and distortional aberration at an intermediate focal length of the zoom lens in the Embodiment 11. FIGS. 46a, 46b and 46c are diagrams respectively showing spherical aberration, astigmatism and distortional aberration at a long focal point end of the zoom lens in the Embodiment 11.

Embodiment 12
f = 38.7~103.2, F/No = 4.6~9.3,
ω = 28.8°~11.8°, $f_1/f_T$ = 0.256, $f_2/f_1$ = −0.851

| i | $r_i$ | $d_i$ | j | $n_j$ | $v_j$ |
|---|---|---|---|---|---|
| 1 | 20.697 | 2.43 | 1 | 1.54814 | 45.82 |
| 2 | 91.824 | 1.48 | | | |
| 3 | −17.979 | 1.50 | 2 | 1.88300 | 40.80 |
| 4 | 82.965 | 1.21 | | | |
| 5 | 38.308 | 3.43 | 3 | 1.49831 | 65.13 |
| 6 | −26.287 | 1.06 | | | |
| 7 | 47.224 | 3.14 | 4 | 1.49700 | 81.61 |
| 8 | −17.474 | variable | | | |
| 9 | −68.836 | 3.82 | 5 | 1.54072 | 47.20 |
| 10 | −16.286 | 1.56 | | | |
| 11 | −12.227 | 1.50 | 6 | 1.75500 | 52.32 |
| 12 | −30.337 | 2.64 | | | |
| 13 | −12.260 | 1.50 | 7 | 1.49700 | 81.61 |
| 14 | −78.656 | | | | |

Aspherical surface (eighth lens face)
K = −1.904722, P = 1.18460E-5,
Q = −2.34679E-8, R = −9.14164E-10,
S = 5.69014E-11
Aspherical surface (ninth lens face)
K = −171.98840, P = 2.85123E-5,
Q = 4.39322E-7, R = 9.72057E-9,
S = −4.29254E-11
Aspherical surface (tenth lens face)
K = −0.278111, P = 1.00929E-5,
Q = 4.48822E-8, R = −4.73245E-9,
S = 1.07031E-10
Variable amounts

| f | 38.7 | 63.1 | 103.2 |
|---|---|---|---|
| $d_8$ | 13.42 | 7.47 | 3.80 |

Figure 12:
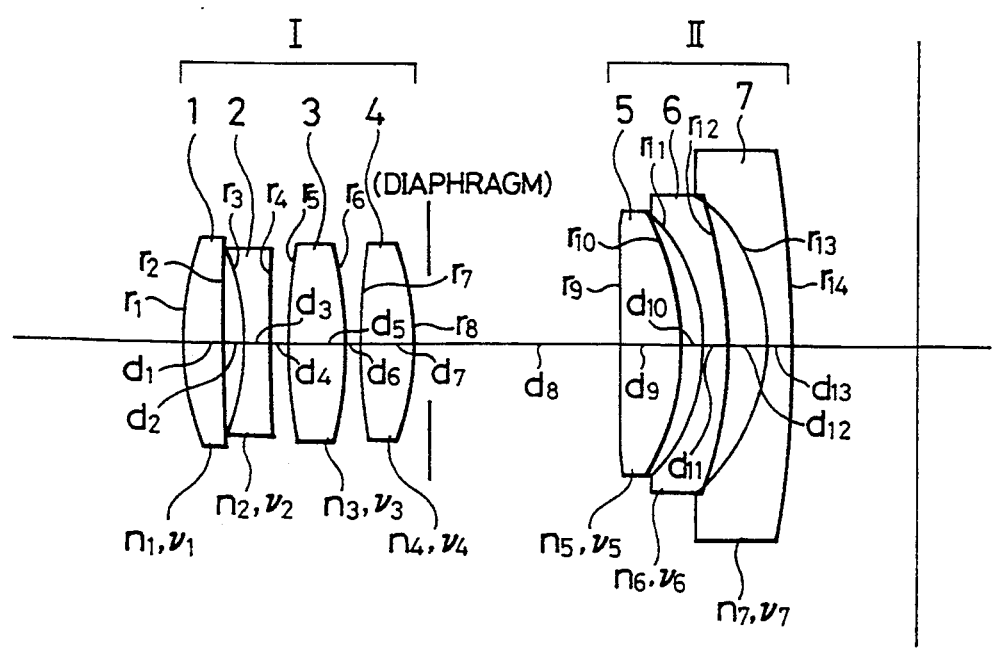
FIG. 12 is a view showing the construction of a zoom lens in accordance with Embodiment 12 of the present invention.

FIG. 12 shows the arrangement of a zoom lens in accordance with the Embodiment 12. FIGS. 47a, 47b and 47c are diagrams respectively showing spherical aberration, astigmatism and distortional aberration at a short focal point end of the zoom lens in the Embodiment 12. FIGS. 48a, 48b and 48c are diagrams respectively showing spherical aberration, astigmatism and distortional aberration at an intermediate focal length of the zoom lens in the Embodiment 12. FIGS. 49a, 49b and 49c are diagrams respectively showing spherical aberration, astigmatism and distortional aberration at a long focal point end of the zoom lens in the Embodiment 12.

The above Embodiments 10 to 12 relate to a zoom lens having each of thirteenth to nineteenth lens structures of the present invention. As can be seen from the aberration diagrams in each of these Embodiments, the respective aberrations in each of these Embodiments are preferably corrected at the short focal point end, the intermediate focal length, and the long focal point end of the zoom lens, thereby providing a preferable performance of the zoom lens.

Embodiment 13
f = 39.3~101.3, FNo = 4.6~9.2,
ω = 28.4~12.1, $f_1/f_T$ = 0.265, $f_2/f_1$ = −0.846,
$(d_3 + d_4)/f_W$ = 0.406

| i | $r_i$ | $d_i$ | j | $n_j$ | $v_j$ |
|---|---|---|---|---|---|
| 1 | 20.924 | 2.91 | 1 | 1.51823 | 58.96 |
| 2 | 144.580 | 1.48 | | | |
| 3 | −28.862 | 6.52 | 2 | 1.84750 | 43.03 |
| 4 | 10.362 | 9.42 | 3 | 1.64328 | 47.94 |
| 5 | −38.350 | 0.17 | | | |
| 6 | 28.908 | 4.50 | 4 | 1.49700 | 81.61 |
| 7 | −20.864 | variable | | | |
| 8 | −40.286 | 2.76 | 5 | 1.62012 | 49.82 |
| 9 | −16.815 | 2.59 | | | |
| 10 | −15.594 | 1.50 | 6 | 1.71300 | 53.94 |
| 11 | −178.680 | 3.58 | | | |
| 12 | −13.497 | 1.50 | 7 | 1.49700 | 81.61 |
| 13 | −44.178 | | | | |

Variable amounts

| f | 39.3 | 63.0 | 101.3 |
|---|---|---|---|

| | | | |
|---|---|---|---|
| d₇ | 13.46 | 7.64 | 4.00 |

Figure 13:
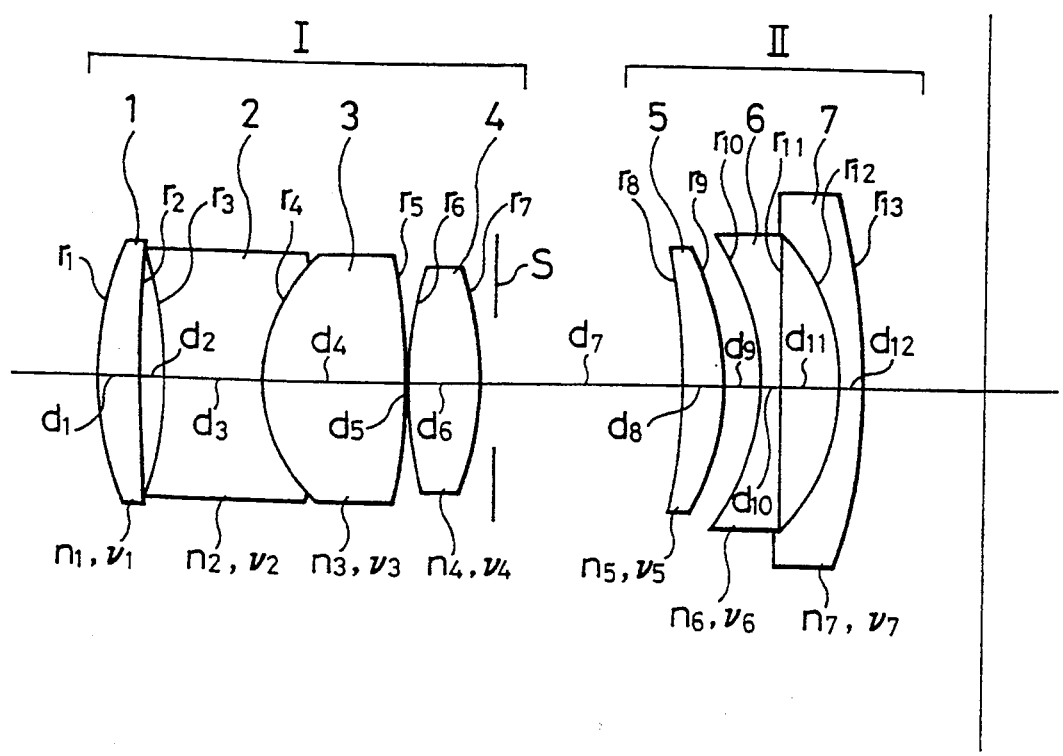
FIG. 13 is a view showing the construction of a zoom lens in accordance with each of Embodiments 13, 14 and 15 of the present invention.

FIG. 13 shows the arrangement of a zoom lens in accordance with the Embodiment 13. FIGS. 50a, 50b and 50c are diagrams respectively showing spherical aberration, astigmatism and distortional aberration at a short focal point end of the zoom lens in the Embodiment 13. FIGS. 51a, 51b and 51c are diagrams respectively showing spherical aberration, astigmatism and distortional aberration at an intermediate focal length of the zoom lens in the Embodiment 13. FIGS. 52a, 52b and 52c are diagrams respectively showing spherical aberration, astigmatism and distortional aberration at a long focal point end of the zoom lens in the Embodiment 13.

Embodiment 14
f = 39.2~102.0, FNo = 4.6~9.3,
ω = 28.4~12.0, f₁/f_T = 0.263, f₂/f₁ = −0.912,
(d₃ + d₄)/f_W = 0.286

| i | r_i | d_i | j | n_j | ν_j |
|---|---|---|---|---|---|
| 1 | 18.386 | 2.40 | 1 | 1.54883 | 45.44 |
| 2 | 55.536 | 1.82 | | | |
| 3 | −22.335 | 3.18 | 2 | 1.88300 | 40.80 |
| 4 | 11.642 | 8.01 | 3 | 1.64328 | 47.94 |
| 5 | −25.667 | 0.10 | | | |
| 6 | 30.249 | 3.90 | 4 | 1.49700 | 81.61 |
| 7 | −20.551 | variable | | | |
| 8 | −30.588 | 2.76 | 5 | 1.68578 | 43.90 |
| 9 | −16.104 | 2.75 | | | |
| 10 | −14.936 | 1.50 | 6 | 1.75500 | 52.32 |
| 11 | −84.445 | 3.48 | | | |
| 12 | −13.976 | 1.50 | 7 | 1.49700 | 81.61 |
| 13 | −35.586 | | | | |

Variable amounts
| f | 39.2 | 63.2 | 102.0 |
|---|---|---|---|
| d₇ | 14.79 | 8.44 | 4.50 |

FIG. 13 shows the arrangement of a zoom lens in accordance with the Embodiment 14. FIGS. 53a, 53b and 53c are diagrams respectively showing spherical aberration, astigmatism and distortional aberration at a short focal point end of the zoom lens in the Embodiment 14. FIGS. 54a, 54b and 54c are diagrams respectively showing spherical aberration, astigmatism and distortional aberration at an intermediate focal length of the zoom lens in the Embodiment 14. FIGS. 55a, 55b and 55c are diagrams respectively showing spherical aberration, astigmatism and distortional aberration at a long focal point end of the zoom lens in the Embodiment 14.

Embodiment 15
f = 39.2~102.0, FNo = 4.6~9.4,
ω = 28.4~12.0, f₁/f_T = 0.258, f₂/f₁ = −0.895,
(d₃ + d₄)/f_W = 0.306

| i | r_i | d_i | j | n_j | ν_j |
|---|---|---|---|---|---|
| 1 | 19.281 | 2.38 | 1 | 1.56732 | 42.84 |
| 2 | 59.527 | 1.47 | | | |
| 3 | −22.688 | 2.99 | 2 | 1.83500 | 42.98 |
| 4 | 10.850 | 9.00 | 3 | 1.63854 | 55.45 |
| 5 | −27.173 | 0.10 | | | |
| 6 | 31.164 | 3.83 | 4 | 1.48749 | 70.44 |
| 7 | −21.004 | variable | | | |
| 8 | −35.612 | 2.85 | 5 | 1.58144 | 40.89 |
| 9 | −15.663 | 2.70 | | | |
| 10 | −14.677 | 1.50 | 6 | 1.77250 | 49.62 |
| 11 | −88.065 | 3.31 | | | |
| 12 | −13.779 | 1.50 | 7 | 1.48749 | 70.44 |
| 13 | −35.118 | | | | |

Variable amounts
| f | 39.2 | 63.2 | 102.0 |
|---|---|---|---|
| d₇ | 14.04 | 8.03 | 4.30 |

FIG. 13 shows the arrangement of a zoom lens in accordance with the Embodiment 15. FIGS. 56a, 56b and 56c are diagrams respectively showing spherical aberration, astigmatism and distortional aberration at a short focal point end of the zoom lens in the Embodiment 15. FIGS. 57a, 57b and 57c are diagrams respectively showing spherical aberration, astigmatism and distortional aberration at an intermediate focal length of the zoom lens in the Embodiment 15. FIGS. 58a, 58b and 58c are diagrams respectively showing spherical aberration, astigmatism and distortional aberration at a long focal point end of the zoom lens in the Embodiment 15.

The above Embodiments 13 to 15 relate to a zoom lens having each of twentieth to twenty-second lens structures of the present invention. As can be seen from the aberration diagrams in each of these Embodiments, the respective aberrations in each of these Embodiments are preferably corrected at the short focal point end, the intermediate focal length, and the long focal point end of the zoom lens, thereby providing a preferable performance of the zoom lens.

As mentioned above, a novel zoom lens of the present invention is constructed by two lens groups, but is composed of a small number of constructional lenses such as seven lenses. An entire length of the zoom lens is short and the zoom lens is compact and has a zoom ratio equal to 2.5 times or more. Further, the zoom lens has a wide field angle providing a half field angle about 30 degrees.

In the above zoom lens, the number of constructional lenses is reduced so that the number of parts for assembly is reduced. Further, since the zoom lens is constructed by two lens groups, the construction of a mechanism for moving the lens groups is simplified.

Many widely different embodiments of the present invention may be constructed without departing from the spirit and scope of the present invention. It should be understood that the present invention is not limited to the specific embodiments described in the specification, except as defined in the appended claims.

What is claimed is:

1. A zoom lens constructed by two lens groups in which a first lens group having a positive focal length is arranged on an object side and a second lens group having a negative focal length is arranged on an image side and a zooming operation is performed by changing a distance between said first and second lens groups;

the first lens group having first to fourth lenses sequentially arranged from the object side toward the image side;

the first lens being constructed by a positive meniscus lens having a convex face directed onto the object side;

the second lens being constructed by a biconcave lens;

the third lens being constructed by a positive lens; and the fourth lens being constructed by a biconvex lens;

the second lens group having fifth to seventh lenses sequentially arranged from the object side toward the image side;

the fifth lens being constructed by a positive meniscus lens having a convex face directed onto the image side;

the sixth lens being constructed by a negative meniscus lens having a convex face directed onto the image side; and the seventh lens being constructed by a negative meniscus lens having a convex face directed onto the image side;

a combined focal length $f_W$ of an entire lens system at a short focal point end thereof, a combined focal length $f_T$ of the entire lens system at a long focal point end thereof, a focal length $f_1$ of the first lens group, a focal length $f_2$ of the second lens group, a thickness $d_3$ of the second lens on an optical axis of the lens system, and a thickness $d_5$ of the third lens on the optical axis of the lens system satisfying the following conditions, $$0.25 < f_1/f_T < 0.28 \qquad (1\text{-}1)$$

$$f_2/f_1 > -0.95 \qquad (1\text{-}2)$$

$$(d_3 + d_5)/f_W > 0.30. \qquad (1\text{-}3)$$

2. A zoom lens as claimed in claim 1, wherein a refractive index $n_2$ of a material of the second lens, an Abbe's number $\nu_4$ of a material of the fourth lens and an Abbe's number $\nu_7$ of a material of the seventh lens satisfy the following conditions, $$n_2 > 1.70 \qquad (2\text{-}1)$$

$$\nu_4 > 65.0 \qquad (2\text{-}2)$$

$$\nu_7 > 65.0. \qquad (2\text{-}3)$$

3. A zoom lens constructed by two lens groups in which a first lens group having a positive focal length is arranged on an object side and a second lens group having a negative focal length is arranged on an image side and a zooming operation is performed by changing a distance between said first and second lens groups;

the first lens group having first to fourth lenses sequentially arranged from the object side toward the image side;

the first lens being constructed by a positive meniscus lens having a convex face directed onto the object side;

the second lens being constructed by a biconcave lens;

the third lens being constructed by a positive lens; and the fourth lens being constructed by a biconvex lens;

the second lens group having fifth to seventh lenses sequentially arranged from the object side toward the image side;

the fifth lens being constructed by a positive meniscus lens having a convex face directed onto the image side;

the sixth lens being constructed by a negative meniscus lens having a convex face directed onto the image side; and the seventh lens being constructed by a negative meniscus lens having a convex face directed onto the image side;

an image side lens face of the fourth lens being constructed by an aspherical surface; and a focal length $f_T$ of an entire lens system at a long focal point end thereof, a focal length $f_1$ of the first lens group and a focal length $f_2$ of the second lens group satisfying the following conditions, $$0.26 < f_1/f_T < 0.29 \qquad (3\text{-}1)$$

$$f_2/f_1 > -1.0. \qquad (3\text{-}2)$$

4. A zoom lens as claimed in claim 3, wherein a distance $X_8(H)$ from a tangential plane to the image side lens face of the fourth lens in a position apart from an optical axis of the lens system on the tangential plane by a distance H, the tangential plane being tangent to the image side lens face of the fourth lens at a point on the optical axis, and curvature $C_8$ of the image side lens face of the fourth lens at the point on the optical axis satisfy the following condition, $$X_8(H) > C_8 \cdot H^2 / \{1 + \sqrt{(1 - C_8^2 \cdot H^2)}\}. \qquad (4\text{-}1)$$

5. A zoom lens as claimed in claim 3 or 4, wherein a refractive index $n_2$ of a material of the second lens, an Abbe's number $\nu_4$ of a material of the fourth lens and an Abbe's number $\nu_7$ of a material of the seventh lens satisfy the following conditions, $$n_2 > 1.70 \qquad (2\text{-}1)$$

$$\nu_4 > 65.0 \qquad (2\text{-}2)$$

$$\nu_7 > 65.0. \qquad (2\text{-}3)$$

6. A zoom lens constructed by two lens groups in which a first lens group having a positive focal length is arranged on an object side and a second lens group having a negative focal length is arranged on an image side and a zooming operation is performed by changing a distance between said first and second lens groups;

the first lens group having first to fourth lenses sequentially arranged from the object side toward the image side;

the first lens being constructed by a positive meniscus lens having a convex face directed onto the object side;

the second lens being constructed by a biconcave lens;

the third lens being constructed by a positive lens; and the fourth lens being constructed by a biconvex lens;

the second lens group having fifth to seventh lenses sequentially arranged from the object side toward the image side;

the fifth lens being constructed by a positive meniscus lens having a convex face directed onto the image side;

the sixth lens being constructed by a negative meniscus lens having a convex face directed onto the image side; and the seventh lens being constructed by a negative meniscus lens having a convex face directed onto the image side;

each of image side lens faces of the fourth and fifth lenses being constructed by an aspherical surface; and a focal length $f_T$ of an entire lens system at a long focal point end thereof, a focal length $f_1$ of the first lens group and a focal length $f_2$ of the second lens group satisfying the following conditions, $$0.25 < f_1/f_T < 0.28 \tag{1-1}$$

$$f_2/f_1 > -0.95 \tag{1-2}$$

7. A zoom lens as claimed in claim 6, wherein a distance $X_8(H)$ from a tangential plane to the image side lens face of the fourth lens in a position apart from an optical axis of the lens system on the tangential plane by a distance H, the tangential plane being tangent to the image side lens face of the fourth lens at a point on the optical axis, and curvature $C_8$ of the image side lens face of the fourth lens at the point on the optical axis satisfy the following condition, $$X_8(H) > C_8 \cdot H^2 / \{1 + \sqrt{(1 - C_8^2 \cdot H^2)}\}. \tag{4-1}$$

8. A zoom lens as claimed in claim 6, wherein a distance $X_{10}(H)$ from a tangential plane to the image side lens face of the fifth lens in a position apart from an optical axis of the lens system on the tangential plane by a distance H, the tangential plane being tangent to the image side lens face of the fifth lens at a point on the optical axis, and curvature $C_{10}$ of the image side lens face of the fifth lens at the point on the optical axis satisfy the following condition, $$X_{10}(H) < C_{10} \cdot H^2 / \{1 + \sqrt{(1 - C_{10}^2 \cdot H^2)}\}. \tag{8-1}$$

9. A zoom lens as claimed in claim 7, wherein a distance $X_{10}(H)$ from a tangential plane to the image side lens face of the fifth lens in a position apart from an optical axis of the lens system on the tangential plane by a distance H, the tangential plane being tangent to the image side lens face of the fifth lens at a point on the optical axis, and curvature $C_{10}$ of the image side lens face of the fifth lens at the point on the optical axis satisfy the following condition, $$X_{10}(H) < C_{10} \cdot H^2 / \{1 + \sqrt{(1 - C_{10}^2 \cdot H^2)}\}. \tag{8-1}$$

10. A zoom lens as claimed in claim 6, wherein a refractive index $n_2$ of a material of the second lens, an Abbe's number $\nu_4$ of a material of the fourth lens and an Abbe's number $\nu_7$ of a material of the seventh lens satisfy the following conditions, $$n_2 > 1.70 \tag{2-1}$$

$$\nu_4 > 65.0 \tag{2-2}$$

$$\nu_7 > 65.0. \tag{2-3}$$

11. A zoom lens as claimed in claim 7, wherein a refractive index $n_2$ of a material of the second lens, an Abbe's number $\nu_4$ of a material of the fourth lens and an Abbe's number $\nu_7$ of a material of the seventh lens satisfy the following conditions, $$n_2 > 1.70 \tag{2-1}$$

$$\nu_4 > 65.0 \tag{2-2}$$

$$\nu_7 > 65.0. \tag{2-3}$$

12. A zoom lens as claimed in claim 8 or 9, wherein a refractive index $n_2$ of a material of the second lens, an Abbe's number $\nu_4$ of a material of the fourth lens and an Abbe's number $\nu_7$ of a material of the seventh lens satisfy the following conditions, $$n_2 > 1.70 \tag{2-1}$$

$$\nu_4 > 65.0 \tag{2-2}$$

$$\nu_7 > 65.0. \tag{2-3}$$

13. A zoom lens constructed by two lens groups in which a first lens group having a positive focal length is arranged on an object side and a second lens group having a negative focal length is arranged on an image side and a zooming operation is performed by changing a distance between said first and second lens groups;

the first lens group having first to fourth lenses sequentially arranged from the object side toward the image side;

the first lens being constructed by a positive meniscus lens having a convex face directed onto the object side;

the second lens being constructed by a biconcave lens;

the third lens being constructed by a positive lens; and the fourth lens being constructed by a biconvex lens;

the second lens group having fifth to seventh lenses sequentially arranged from the object side toward the image side;

the fifth lens being constructed by a positive meniscus lens having a convex face directed onto the image side;

the sixth lens being constructed by a negative meniscus lens having a convex face directed onto the image side; and the seventh lens being constructed by a negative meniscus lens having a convex face directed onto the image side;

each of an image side lens face of the fourth lens, and object and image side lens faces of the fifth lens being constructed by an aspherical surface; and a focal length $f_T$ of an entire lens system at a long focal point end thereof, a focal length $f_1$ of the first lens group and a focal length $f_2$ of the second lens group satisfying the following conditions, $$0.24 < f_1/f_T < 0.27 \tag{13-1}$$

$$f_2/f_1 > -0.90. \tag{13-2}$$

14. A zoom lens as claimed in claim 13, wherein a distance $X_8(H)$ from a tangential plane to the image side lens face of the fourth lens in a position apart from an optical axis of the lens system on the tangential plane by a distance H, the tangential plane being tangent to the image side lens face of the fourth lens at a point on the optical axis, and curvature $C_8$ of the image side lens face of the fourth lens at the point on the optical axis satisfy the following condition, $$X_8(H) > C_8 \cdot H^2 / \{1 + \sqrt{(1 - C_8^2 \cdot H^2)}\}. \quad (4\text{-}1)$$

15. A zoom lens as claimed in claim 13, wherein a distance $X_9(H)$ from a tangential plane to the object side lens face of the fifth lens in a position apart from an optical axis of the lens system on the tangential plane by a distance H, the tangential plane being tangent to the object side lens face of the fifth lens at a point on the optical axis, curvature $C_9$ of the object side lens face of the fifth lens at the point on the optical axis, a distance $X_{10}(H)$ from another tangential plane to the image side lens face of the fifth lens in another position apart from the optical axis of the lens system on the another tangential plane by the distance H, the another tangential plane being tangent to the image side lens face of the fifth lens at another point on the optical axis, and curvature $C_{10}$ of the image side lens face of the fifth lens at said another point on the optical axis satisfy the following condition, $$X_{10}(H) - X_9(H) < C_{10} \cdot H^2 / \{1 + \sqrt{(1 - C_{10}^2 \cdot H^2)}\} - C_9 \cdot H^2 / \{1 + \sqrt{(1 - C_9^2 \cdot H^2)}\}. \quad (15\text{-}1)$$

16. A zoom lens as claimed in claim 14, wherein a distance $X_g(H)$ from a tangential plane to the object side lens face of the fifth lens in a position apart from an optical axis of the lens system on the tangential plane by a distance H, the tangential plane being tangent to the object side lens face of the fifth lens at a point on the optical axis, curvature $C_9$ of the object side lens face of the fifth lens at the point on the optical axis, a distance $X_{10}(H)$ from another tangential plane to the image side lens face of the fifth lens in another position apart from the optical axis of the lens system on the another tangential plane by the distance H, the another tangential plane being tangent to the image side lens face of the fifth lens at another point on the optical axis, and curvature $C_{10}$ of the image side lens face of the fifth lens at said another point on the optical axis satisfy the following condition, $$X_{10}(H) - X_9(H) < C_{10} \cdot H^2 / \{1 + \sqrt{(1 - C_{10}^2 \cdot H^2)}\} - C_9 \cdot H^2 / \{1 + \sqrt{(1 - C_9^2 \cdot H^2)}\}. \quad (15\text{-}1)$$

17. A zoom lens as claimed in claim 13, wherein a refractive index $n_2$ of a material of the second lens, an hbbe's number $\nu_4$ of a material of the fourth lens and an Abbe's number $\nu_7$ of a material of the seventh lens satisfy the following conditions, $$n_2 > 1.70 \quad (2\text{-}1)$$

$$\nu_4 > 65.0 \quad (2\text{-}2)$$

$$\nu_7 > 65.0. \quad (2\text{-}3)$$

18. A zoom lens as claimed in claim 14, wherein a refractive index $n_2$ of a material of the second lens, an Abbe's number $\nu_4$ of a material of the fourth lens and an Abbe's number $\nu_7$ of a material of the seventh lens satisfy the following conditions, $$n_2 > 1.70 \quad (2\text{-}1)$$

$$\nu_4 > 65.0 \quad (2\text{-}2)$$

$$\nu_7 > 65.0. \quad (2\text{-}3)$$

19. A zoom lens as claimed in claim 15 or 16, wherein a refractive index $n_2$ of a material of the second lens, an Abbe's number $\nu_4$ of a material of the fourth lens and an Abbe's number $\nu_7$ of a material of the seventh lens satisfy the following conditions, $$n_2 > 1.70 \quad (2\text{-}1)$$

$$\nu_4 > 65.0 \quad (2\text{-}2)$$

$$\nu_7 > 65.0. \quad (2\text{-}3)$$

20. A zoom lens constructed by two lens groups in which a first lens group having a positive focal length is arranged on an object side and a second lens group having a negative focal length is arranged on an image side and a zooming operation is performed by changing a distance between said first and second lens groups;

the first lens group having a first lens, a joining lens and a fourth lens sequentially arranged from the object side toward the image side;

the first lens being constructed by a positive meniscus lens having a convex face directed onto the object side;

the joining lens being constructed by a second lens as a biconcave lens and a third lens as a biconvex lens; and the fourth lens being constructed by a biconvex lens;

the second lens group having fifth to seventh lenses sequentially arranged from the object side toward the image side;

the fifth lens being constructed by a positive meniscus lens having a convex face directed onto the image side;

the sixth lens being constructed by a negative meniscus lens having a convex face directed onto the image side; and the seventh lens being constructed by a negative meniscus lens having a convex face directed onto the image side;

a combined focal length $f_W$ of an entire lens system at a short focal point end thereof, a combined focal length $f_T$ of the entire lens system at a long focal point end thereof, a focal length $f_1$ of the first lens group, a focal length $f_2$ of the second lens group, a thickness $d_3$ of the second lens on an optical axis of the lens system, and a thickness $d_4$ of the third lens on the optical axis of the lens system satisfying the following conditions, $$0.24 < f_1/f_T < 0.28 \quad (20\text{-}1)$$

$$f_2/f_1 > -0.95 \quad (1\text{-}2)$$

$$(d_3 + d_4)/f_W > 0.26. \quad (20\text{-}3)$$

21. A zoom lens as claimed in claim 20, wherein a refractive index $n_2$ of a material of the second lens and an Abbe's number $\nu_4$ of a material of the fourth lens satisfy the following conditions, $$n_2 > 1.70 \quad (2\text{-}1)$$

$v_4 > 65.0.$ (2-2)

22. A zoom lens as claimed in claim 20 or 21, wherein an Abbe's number $v_7$ of a material of the seventh lens satisfies the following condition, $v_7 > 65.0.$ (2-3)

* * * * *